(12) United States Patent
Sader et al.

(10) Patent No.: US 6,610,129 B1
(45) Date of Patent: Aug. 26, 2003

(54) INK-JET INKS WHICH PREVENT KOGATION AND PROLONG RESISTOR LIFE IN INK-JET PENS

(75) Inventors: Richard A Sader, San Diego, CA (US); Paul J. Bruinsma, San Diego, CA (US); Amiya K Chatterjee, San Diego, CA (US); Howard A Doumaux, San Diego, CA (US); Noah C. Lassar, San Diego, CA (US); Matthew D Giere, San Diego, CA (US)

(73) Assignee: Hewlett-Packard Development Company, Palo Alto, CA (US)

( * ) Notice: Subject to any disclaimer, the term of this patent is extended or adjusted under 35 U.S.C. 154(b) by 0 days.

(21) Appl. No.: 09/543,382

(22) Filed: Apr. 5, 2000

(51) Int. Cl.[7] .............................................. C09D 11/00
(52) U.S. Cl. ................ 106/31.27; 106/31.6; 106/31.95; 106/31.86; 106/31.58
(58) Field of Search .................. 106/31.27, 31.58, 106/31.86, 31.6, 31.95

(56) References Cited

U.S. PATENT DOCUMENTS

| | | | |
|---|---|---|---|
| 5,062,892 A | 11/1991 | Halko | 106/31.58 |
| 5,062,893 A | 11/1991 | Adamic et al. | 106/31.52 |
| 5,614,007 A | 3/1997 | Kurabayashi et al. | 422/189 |
| 5,679,724 A * | 10/1997 | Sacripante et al. | 523/161 |
| 5,782,967 A | 7/1998 | Shirota et al. | 106/31.58 |
| 5,792,249 A | 8/1998 | Shirota et al. | 106/31.27 |
| 5,795,376 A | 8/1998 | Ide et al. | 106/31.73 |
| 6,013,123 A * | 1/2000 | Scarpetti | 106/31.27 |
| 6,254,669 B1 * | 7/2001 | Lavery et al. | 106/31.47 |

FOREIGN PATENT DOCUMENTS

| | | | |
|---|---|---|---|
| DE | 3132247 A1 | 6/1982 | C09D/11/16 |
| EP | 0425150 A2 | 5/1991 | C09D/11/00 |
| EP | 0499425 A1 | 8/1992 | C09D/11/00 |
| EP | 0848045 A1 | 6/1998 | C09D/11/00 |

* cited by examiner

*Primary Examiner*—Helene Klemanski
*Assistant Examiner*—Veronica F. Faison
(74) *Attorney, Agent, or Firm*—W. Bradley Haymond

(57) ABSTRACT

An ink-jet ink composition and a method of printing with the ink composition comprising at least one colorant and an aqueous vehicle comprising at least one refractory or noble metal-reactive component.

32 Claims, 15 Drawing Sheets

2,6-Pyridinedicarboxylic acid

Aminodiacetic acid

2-Pyridinedicarboxylic acid (Picoline acid)

INK-JET INKS WHICH PREVENT KOGATION AND PROLONG RESISTOR LIFE IN INK-JET PENS

FIELD OF INVENTION

The present invention relates to ink compositions suitable for thermal ink-jet printing, and, more particularly, to ink compositions for preventing kogation and prolonging resistor life in ink-jet pens.

BACKGROUND OF INVENTION

The use of ink-jet printing systems has grown dramatically in recent years. This growth may be attributed to substantial improvements in print resolution and overall print quality coupled with appreciable reduction in cost. Today's ink-jet printers offer acceptable print quality for many commercial, business, and household applications at costs fully an order of magnitude lower than comparable products available just a few years ago. Notwithstanding their recent success, intensive research and development efforts continue toward improving ink-jet print quality, while further lowering cost to the consumer.

An ink-jet image is formed when a precise pattern of dots is ejected from a drop-generating device known as a "printhead" onto a printing medium. The typical ink-jet printhead has an array of precisely formed nozzles located on a nozzle plate and attached to an ink-jet printhead substrate. The substrate incorporates an array of firing chambers that receive liquid ink (colorants dissolved or dispersed in a solvent) through fluid communication with one or more ink reservoirs. Each chamber has a thin-film resistor, known as a "firing resistor," located opposite the nozzle so ink can collect between the firing resistor and the nozzle. In particular, each resistor element, which is typically a pad of a resistive material, measures about 35 $\mu$m×35 $\mu$m. The printhead is held and protected by an outer packaging referred to as a print cartridge, i.e., ink-jet pen.

Upon energizing of a particular resistor element, a droplet of ink is expelled through the nozzle toward the print medium, whether paper, transparent film or the like. The firing of ink droplets is typically under the control of a microprocessor, the signals of which are conveyed by electrical traces to the resistor elements, thereby forming alphanumeric and other characters on the print medium.

The small length scale of the nozzles, typically 10 to 40 $\mu$m in diameter, require that the ink not clog the nozzles. Further, repeated firings of the resistor elements that must withstand many millions of firings over the life of the ink cartridge to be commercially practical, can result in fouling of the resistor elements and degrading pen performance. This build up of residue on the resistor elements is unique to thermal ink-jet printers and is known as kogation and defined as the build-up of residue (koga) on the resistor surface.

Besides the problem of kogation, thermal ink-jet printer resistor surfaces are susceptible to passivation layer damage by cavitation, contamination and many other sources. Such passivation layer damage literally results in microscopic holes on the resistor surface which significantly shorten resistor life.

Customer and profit demands require smaller drop volumes, color-laser-like ink permanence, and "permanent" print heads. Smaller drop volumes give better spatial and chroma resolutions. However, kogation appears to be worse in smaller drop volume pens. Smaller drop volumes also means that each resistor must fire a greater number of times to transfer the same amount of ink to the page. The greater number of firings required of the resistor results in more passivation layer damage.

In spite of the increased pressure on kogation and passivation layer damage, the trend is towards longer print-head life, using pens with replaceable ink supplies such as (but not limited to) off-axis ink reservoirs that are connected to the pens by hoses and ink reservoirs that snap onto the print head. Infrequent need for replacement of the print heads with prolonged resistor life reduces the cost and servicing required of the customer. High-speed, high-throughput photocopier-like products that may be envisioned for the future will greatly increase ink usage and will most likely greatly push further the demands on print-head life. With higher pen-to-paper relative speeds, high-throughput products will be more sensitive to kogation induced drop velocity variations.

It has been previously disclosed that oxyanions, especially phosphates, reduce kogation. The mechanism was attributed to the additive eliminating or reducing adsorption of dye and/or decomposition products onto the resistor. Furthermore, the phosphate esters disclosed for kogation control are short chain phosphate esters, not long-chained, surface active phosphate esters as in the present invention. It has also been disclosed that organic acid sulfonate, such as sodium methane sulfonate, and bile salt (e.g., sodium cholate) additives can be used for reducing kogation. Other disclosed ways of achieving kogation control are, for example, macrocyclic polyethers to complex cations in ink-jet ink compositions; isopropanol/water rinse to remove phosphate antistatic material from ink foam; and removing koga by various mechnical means such as applying pressure to the channels of the ink-jet pen or dry-firing the resistor. Recently, it has been disclosed that phytic acid in ink-jet ink can be used to reduce foreign matter deposits on a surface of an ink-jet heating head.

The use of phosphate ester in ink-jet inks has also been disclosed. However, such disclosures only show the general utility of phosphate esters to produce a surfactant effect, such as for improved water-fastness, and do not propose phosphate esters as a solution to the problem of kogation or passivation layer damage.

The use of ethylenediaminetetraacetic acid (EDTA) to capture calcium for improving the problem of crusting/decap (i.e., formation of ink precipitate either in the pen nozzle or immediately outside the pen nozzle due to exposure of ink to air) in ink-jet inks has also been disclosed. Furthermore, above 100 ppm EDTA was found to erode away the resistor coating, while a slight amount of EDTA was asserted to have the positive effect of preventing a large amount of the koga from adhering to the resistor surface, thus maintaining the resistor surface in a smooth state.

Nitrate and phosphate ions have been used in ink-jet ink compositions to prevent kogation. In ink-jet pens currently on the market, these two solutions have proved to have little benefit and substantial drawbacks. Both nitrate and phosphate ions have potential health and environmental complications and phosphate ion has been shown to etch the tantalum surfaces of resistors in ink-jet pens. Something is therefore needed to reduce kogation on ink-jet resistors which does not have the negative effects that accompany nitrate and phosphate ions.

Even though some kogation and/or passivation layer damage control methods in ink-jet ink pens are known, all of them are either limited in their effectiveness, are not economically feasible or have undesirable side effects for pens needing long resistor life. Thus, there is even more of a need to find a way to effectively deal with the problem of kogation and passivation layer damage on ink-jet resistors.

SUMMARY OF THE INVENTION

The present invention relates to an ink-jet ink composition comprising at least one colorant; and an aqueous vehicle, the vehicle comprising at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum.

The present invention relates to a method for ink-jet printing, said method comprising the step of ejecting ink, said ink comprising at least one colorant; and an aqueous vehicle, the vehicle comprising at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum.

DETAILED DESCRIPTION OF THE INVENTION

Figure 1:
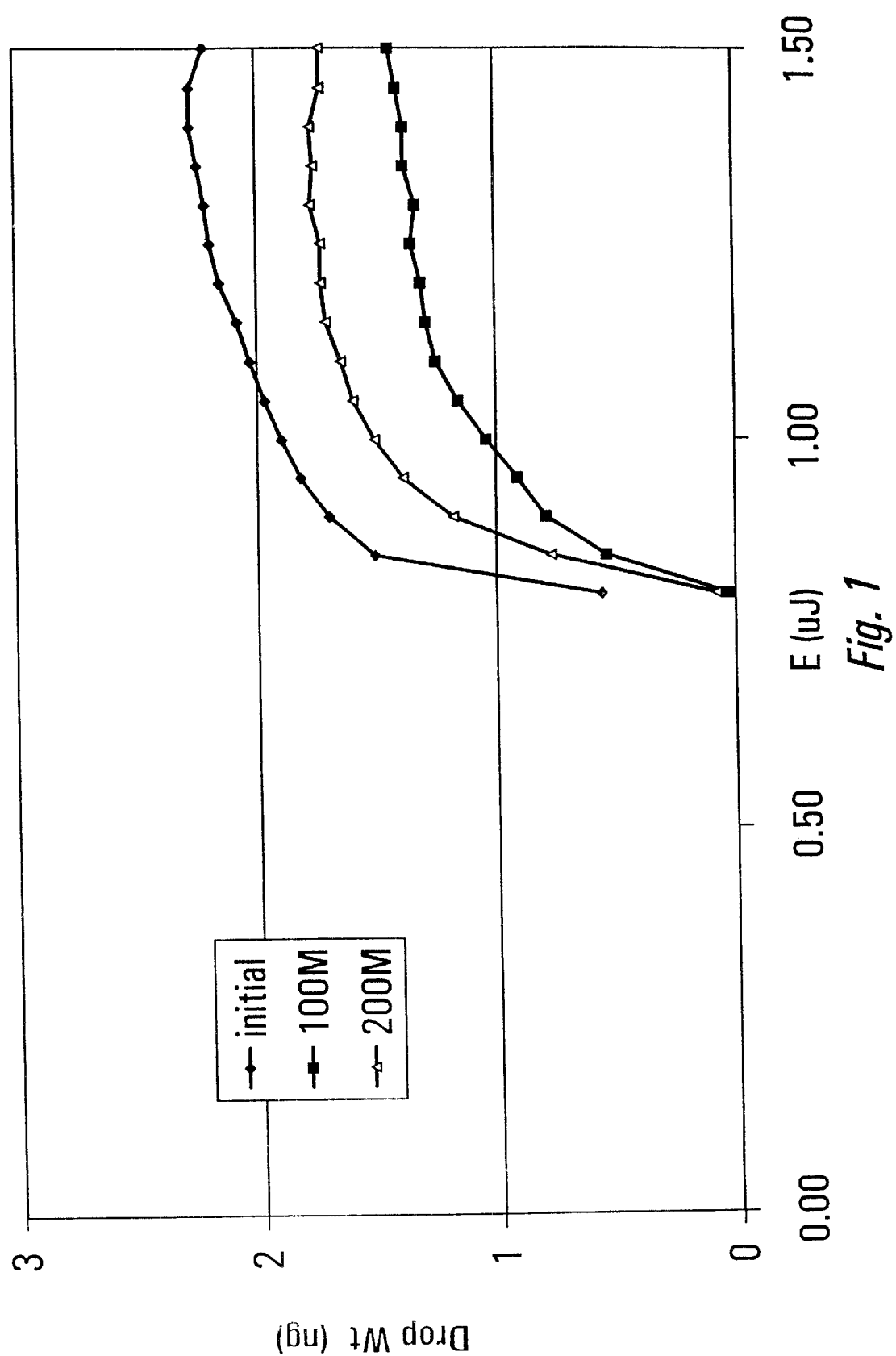
FIG. 1 is a Turn On Energy (TOE) graph for a pen plotting the effect of increasing electrical energy in $\mu J$ on ink drop weight in ng of ink 761 (composition described in Table 1) at initial production of drops, at 100 million drops and at 200 million drops. The Y axis plots ink drop weight in ng. The X axis plots Electrical energy in $\mu J$.

The invention described herein is directed to ink-jet inks for printing ink-jet images using commercially available ink-jet printers such as, for example but not limited to, HP DeskJet® printers, manufactured by Hewlett-Packard Company, of Palo Alto, Calif. The inks enable production of near photographic images having little or no coalescence, excellent waterfastness, and reduced dry time, on a range of print media, in particular, for example but not limited to, plain white, 8½×11", 20 lb. weight, printer paper conventionally used for office and home computers.

As stated above in the background, something is needed to reduce kogation on ink-jet resistors which does not have the negative effects that accompany nitrate and phosphate ions. Applicants have found that phosphate esters in ink-jet inks create a beneficial microsurface on the tantalum layer of the ink-jet resistor. This microsurface has the effect of preventing passivation layer damage of the resistor by decreasing pitting and etching on the resistor surface as well as preventing kogation. This combination of protection of the resistor surface from etching and pitting as well as preventing kogation has the overall effect of improving resistance to early life failure of resistors, especially when compared to the effect of using phosphate, nitrate ion and the use of no ion at all. The combination of phosphate esters with chelating agents provides even greater kogation prevention by preventing the formation of precipitates of phosphate ester surfactants with free metal ions in pens and by preventing precipitation of the colorants with free metals.

The use of phosphate ester with or without chelating agent provides the best kogation resistance and improvement in the rate of resistor failure seen to date of all known solutions involving additives to normal ink components. One can diminish kogation by choosing water-soluble dyes, but this has the disadvantage of providing less image permanence under wet conditions.

Kogation is considered a "charring" of ink components on the resistor surface in a thermal-inkjet pen, leading to a buildup of a deposit on the resistor that is visible under an optical microscope. This deposit, or "koga," results in a loss of both drop velocity and drop weight. The koga either disrupts even growth of the vapor-drive bubble by providing low energy nucleation sites, or interferes with heat transfer by acting as a thermal insulator. A loss of drop weight over the life of the pen reduces the chroma or optical density of the ink on the paper and thus degrades print quality. A loss of drop weight over the life of the pen reduces the accuracy of drop placement on the paper and thus degrades print quality.

Addition of a surface-active phosphate ester to a thermal-inkjet ink prevents or reduces kogation and passivation layer damage and can prolong resistor life. However, the kogation/passivation layer damage prevention power of the surface-active phosphate ester is greater if combined with a metal chelating agent such as EDTA. In addition, surface-active phosphate esters tend to form gummy precipitates with metal ions, especially aluminum and trivalent iron ions even at low bulk concentrations around 1 ppm. By chelating the metal ions the formation of salts with the phosphate head-group of the surface-active phosphate ester is prevented and ink is less susceptible to metal ion contamination. Furthermore, surface-active phosphate esters form viscous precipitates with organotin compounds, especially with those from dioctyltin dilaurate and dibutyltin dilaurate. By chelating the organotin compounds with a chelator such as 2,6-pyridinedicarboxylic acid (a.k.a. dipicoline acid), aminodiacetic acid and 2-pydine carboxylic acid (Picoline Acid) (structures shown in FIG. 17), the formation of the viscous precipitate is prevented.

Resistors in thermal-inkjet pens are coated first with passivation layers that electrically and chemically protect the resistor from the ink. On top of these passivation layers is a hard refractory or noble metal layer, for example, titanium, zirconium, hafnium, vanadium, niobium, tantalum, chromium, molybdenum, tungsten, gold, silver and platinum, preferably, tantalum, that minimizes cavitation damage to the resistor during the vapor drive-bubble collapse. A soak of a tantalum surface in an ink containing a surface-active phosphate ester followed by a water rinse produces a surface with a higher contact angle with water (more hydrophobic) than the original surface. This is probably because phosphate headgroups chemi-sorb to the tantalum, leaving the hydrocarbon tails "sticking-out" away from the tantalum. Though it is difficult to be sure of the exact mechanism for the kogation prevention, it is believed the surface-active phosphate ester reduces adsorption of dyes and other ink components onto the tantalum resistor coating. This prevents surface reactions on the tantalum that would degrade the adsorbed ink components into insoluble deposits, e.g., koga. It also prevents wearing away of the tantalum layer resulting in damage to the passivation layer, thus prolonging the life of the resistor.

Metal ions promote kogation by either forming precipitates with the dyes or other ink components or by acting as catalysts in degradation reactions. Strong effects are seen for trivalent metal ions such as iron (III), aluminum and chromium (III). The kogation effect of iron (III) and aluminum appears to be much stronger in the presence of a surface-active phosphate ester most likely due to the strong interaction of the metal with the phosphate headgroup.

Sources of metal ions include impurities in the raw materials, catalysts used in dye synthesis, corrosion of pen filling equipment and corrosion of metal parts within the pens. Corrosion is a particular concern because it can result in locally high metals concentrations that can precipitate the surface-active phosphate esters. These precipitates can clog print-head nozzles.

Organotin compounds promote nozzle clogging by forming viscous precipitates with surface-active phosphate esters. Sources of organotin compounds include catalysts used in the synthesis of polymeric pen materials and polymeric adhesives.

In one embodiment, the present invention relates to an ink-jet ink composition for reducing kogation and prolonging ink-jet pen life comprising at least one colorant; and an aqueous vehicle, the vehicle comprising at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum.

In a preferred embodiment of the ink-jet ink composition, the refractory or noble metal-reactive component for preventing kogation and prolong resistor life is from 0.1 to 3% by weight of the ink composition. In a more preferred embodiment, for preventing kogation, the refractory or noble metal-reactive component is from 0.2 to 0.5% by weight of the ink composition. In another more preferred embodiment, for prolonging resistor life, the refractory or noble metal-reactive component is from 0.5 to 3% by weight of the ink composition.

In another preferred embodiment of the ink-jet ink composition, the at least one refractory or noble metal-reactive component of the above-described ink-jet ink composition comprises phosphate esters.

In a more preferred embodiment of the ink-jet ink composition, the phosphate esters have the structure

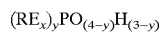

where R is a branched hydrocarbon, unbranched hydrocarbon, or perfluoronated hydrocarbon with at least eight carbons; E is an ethyoxy group (—$CH_2CH_2O$—); X is an integer greater than or equal to 0 and Y is an integer from 1 to 3.

In yet another more preferred embodiment of the ink-jet ink composition, the refractory or noble metal coating the outer layer of the resistor surface is tantalum.

Applicants have found that low drop volume domains are more prone to kogation. It follows that the benefits of kogation control with phosphate esters, metal chelators and/or organometal chelators on the function and longevity of small drop volume pens are especially significant. Therefore, in another preferred embodiment of the ink-jet ink composition, the ink-jet pen has a minimum drop volume range of from 1 to 10 picoliters. In yet a more preferred embodiment of the ink-jet ink composition, the ink-jet pen has a minimum drop volume range of from 3 to 6 picoliters.

In still another preferred embodiment of the ink-jet ink composition, the ink-jet pen can be fired at least 50 million times without being replaced and in a more preferred embodiment, the ink-jet pen can be fired at least 100 million times without being replaced. In another preferred embodiment, ink in the ink-jet pen is refillable.

In yet another preferred embodiment of the ink-jet ink composition, the at least one colorant is selected from a group consisting of a dye and a pigment.

In still another embodiment of the ink-jet ink composition, the aqueous vehicle further comprises at least one chelating agent and in a more preferred embodiment, the at least one chelating agent is from 0.1 to 1% by weight of the ink composition.

In another more preferred embodiment of the ink-jet ink composition, the at least one chelating agent is selected from the group consisting of simple metal chelators and organometal chelators.

In a most preferred embodiment, the simple metal chelators are selected from the group consisting of EDTA, Diethylenetraminepentaacetic acid (PTPA), trans-1,2-diaminocyclohexanetetraacetic acid (CDTA), (ethylenedioxy) diethylene dinitrilotetraacetic acid (EGTA), malonic acid, and salicylic acid. In another most preferred embodiment, the organometal chelators are selected from the group consisting of 2,6-pyridinedicarboxylic acid, 1,2-pyridylazo-2-naphthol and pyrocatecholl violet.

In a separate embodiment, the present invention relates to a method for ink-jet printing comprising the step of ejecting ink, the ink comprising at least one colorant; and an aqueous vehicle, the vehicle comprising at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum.

In a preferred embodiment of the method, the refractory or noble metal-reactive component is from 0.1 to 3% by weight of the ink composition. In a more preferred embodiment for preventing kogation, the refractory or noble metal-reactive component is from 0.2 to 0.5% by weight of the ink composition. In another more preferred embodiment for prolonging resistor life, the refractory or noble metal-reactive component is from 0.5 to 3% by weight of the ink composition.

In another preferred embodiment of the method, the at least one refractory or noble metal-reactive component of the above-described ink-jet ink composition comprises phosphate esters.

In a more preferred embodiment of the method, the phosphate esters have the structure

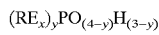

where R is a branched hydrocarbon, unbranched hydrocarbon, or perfluoronated hydrocarbon with at least eight carbons; E is an ethyoxy group (—CH$_2$CH$_2$O—); X is an integer greater than or equal to 0 and Y is an integer from 1 to 3.

In yet another more preferred embodiment of the method, the refractory or noble metal coating the outer layer of the resistor surface is tantalum.

In another preferred embodiment of the method, the ink-jet pen has a minimum drop volume range of from 1 to 10 picoliters. In yet a more preferred embodiment of the method, the ink-jet pen has a minimum drop volume range of from 3 to 6 picoliters.

In still another preferred embodiment of the method, the ink-jet pen can be fired at least 50 million times without being replaced and in a more preferred embodiment, the ink-jet pen can be fired at least 100 million times without being replaced. In another preferred embodiment, ink in the ink-jet pen is refillable.

In yet another preferred embodiment of the method, the at least one colorant is selected from a group consisting of a dye and a pigment.

In still another embodiment of the method, the aqueous vehicle further comprises at least one chelating agent and in a more preferred embodiment, the at least one chelating agent is from 0.1 to 1% by weight of the ink composition.

In another more preferred embodiment of the method, the at least one chelating agent is selected from the group consisting of simple metal chelators and organometal chelators. In a most preferred embodiment, the simple metal chelators are selected from the group consisting of EDTA, Diethylenetraminepentaacetic acid (PTPA), trans-1,2-diaminocyclohexanetetraacetic acid (CDTA), (ethylenedioxy) diethylene din itrilotetraacetic acid (EGTA), malonic acid, and salicylic acid. In another most preferred embodiment, the organometal chelators are selected from the group consisting of 2,6-pyridinedicarboxylic acid, 1,2-pyridylazo-2-naphthol and pyrocatecholl violet.

All concentrations herein are in weight percent of total ink composition, unless otherwise indicated. The purity of all components is that employed in normal commercial practice for ink-jet inks.

Surfactant

Surfactants suitably employed in the practice of the invention include anionic and nonionic surfactants. Examples of anionic surfactants include: Sulfonate surfactants such as Sulfosuccinates (Aerosol OT, A196; AY and GP, available from CYTEC) and Sulfonates (Aerosol DPOS45, OS available from CYTEC; Witconate C-50H available from WITCO; Dowfax 8390 available from DOW); and Fluoro surfactants (Fluorad FC99C available from 3M). Examples of nonionic surfactants include: Fluoro surfactants (Fluorad FC170C available from 3M); Alkoxylate surfactants (Tergitol series 15S-5, 15S-7, and 15S-9 available from Union Carbide); and Organosilicone surfactants (Silwet L-77 and L-76-9 available from WITCO). These surfactants provide the necessary dot spread on plain paper and special media, such as photobase glossy paper, for providing excellent image quality.

Colorants

The inks made according to the present invention comprise at least one colorant, preferably at least one dye. The amount of dye added to the vehicle in prior compositions and the inventive compositions tend to be a function of choice, and is largely dependent upon solubility of the dye in the vehicle and the color intensity of the dye. Typical amounts of dye are between about 0.1 wt % to about 10 wt % of ink composition, preferably, between about 0.1 and 5 wt %. In compositions of the invention, the dye is preferably colored rather than black, although any of the dyes used in inks for in-jet printers may be employed. Illustrative suitable dyes include Direct Blue 199 (available from Avecia as Projet Cyan Special), Acid Blue 9; Direct Red 9, Direct Red 227, Magenta 377 (available from Ilford AG, Rue de I'lndustrie, CH-1700 Fribourg, Switzerland), Acid Yellow 23, Direct Yellow 132, Direct Yellow 86, Yellow 104 (Ilford AG), Direct Yellow 4 (BASF), Yellow PJY H-3RNA (Avecia), and Direct Yellow 50 (Avecia). More preferably, Direct Blue 199, Magenta 377, and Ilford Yellow 104 are employed as the cyan, magenta, and the yellow colorants. Although in a preferred embodiment, the invention is directed to dye-based ink, addition of surface active phosphate esters would also provide benefit to pigment-based ink.

Other Ingredients

The inks of the present invention may optionally comprise components such as buffers, metal chelators, and biocides, as are well known in the art of ink-jet ink formulation.

Buffer

Buffers optionally employed in the practice of the invention to modulate pH can be organic-based biological buffers or inorganic buffers, preferably, organic-based. Further, the buffers employed should provide a pH ranging from about 3 to about 9 in the practice of the invention, preferably about 4 to about 6 and most preferably from about 4 to about 5. Examples of preferably-employed buffers include succinic acid, tris(hydroxymethyl)aminomethane, available from companies such as Aldrich Chemical (Milwaukee, Wis.), 4-morpholineethanesulfonic acid (MES), and 4-morpholinepropanesulfonic acid (MOPS). Most preferably, succinic acid is employed in the practice of the invention.

The inks of the present invention optionally comprise 0 to about 1.5 wt % buffer. More preferably, the inks comprise from about 0.1 to about 0.5 wt % buffer, with a concentration from about 0.1 to about 0.3 wt % being the most preferred.

Metal Chelator

Metal chelators optionally employed in the practice of the invention are used to bind transition metal cations that may be present in the ink. Examples of preferably-employed metal chelators include: EDTA, Diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, salicylic acid or other chelators that can bind transition metal cations. More preferably, EDTA, and DTPA, and most preferably, EDTA in its disodium salt form is employed in the practice of the invention.

The inks of the present invention optionally comprise 0 to about 1.5 wt % metal chelator. More preferably, the inks comprise from about 0.1 to about 0.5 wt % metal chelator, with a concentration from about 0.1 to about 0.3 wt % being the most preferred.

Organotin Chelator

Organotin chelators optionally employed in the practice of the invention are used to bind organotin compound that may leach into the ink. Examples of preferably-employed organotin chelators include: 2,6-pyridinecarboxylic acid, 1,2-pyridylazo-2-naphthol and pyrocatecholl violet and other chelators that can bind organotin compounds. Most preferably, 2,6-pyridinedicarboxylic acid is employed in the practice of the invention.

Biocide

Any of the biocides commonly employed in ink-jet inks may optionally be employed in the practice of the invention, such as Nuosept 95, available from Huls America (Piscataway, N.J.); Proxel GXL, available from Zeneca (Wilmington, Del.); and glutaraldehyde, available from Union Carbide Company (Bound Brook, N.J.) under the trade designation Ucarcide 250. Proxel GXL is the preferred biocide.

The inks of the present invention optionally comprise 0 to about 1.5 wt % biocide. More preferably, the inks comprise from about 0.1 to about 0.5 wt % biocide, with a concentration from about 0.1 to about 0.3 wt % being the most preferred.

INDUSTRIAL APPLICABILITY

The ink formulations are expected to find use in thermal ink-jet printing applications to increase dot gain while maintaining excellent color-to-color bleed alleviation, particularly when using photobase glossy paper.

EXAMPLES

Example 1

A control ink was prepared comprising 1% Dowfax 8390; 1.88% 2-Ethyl-2-hydroxymethyl 1,3-dipropylene glycol (EHPD); 6.13% M008-AR52 Na Salt; 8.33% 1,5-Pentanediol (96%); 8.84% 2-Pyrrolidinone; 47.2% S175517 PTD 19/120; 1.87% Succinic Acid; 0.94% Tergitol 15-S-5 Nonionic; 0.56% Tergitol 15-S-7 Nonionic; and balance water.

A series of inks were prepared according to Table 1. All inks and the Control further comprised from about 0.1 wt % to about 5 wt % of a colorant with the appropriate hue for the selected ink color.

TABLE 1

| Ink ID | Aqueous Vehicle Additive | Additive % Wt |
|---|---|---|
| 761 Control (C) | Dowfax ® 8390, EHPD, MOO8-AR52 Na Salt; 1,5-Pentanediol 96%; 2-Pyrrolidinone; S175517 PTD 19/120; Succinic Acid; Tergitol ® 15-S-5 Nonionic; Tergitol ® 15-S-7 Nonionic | 1.0%; 1.9%; 6.1%; 8.3%; 8.8%; 47%; 1/9%; 0.94%; 0.56% |
| 762 | C + EDTA | 0.10% |
| 763 | C + phosphate ester surfactant | 3.0% |
| 764 | C + polyphosphate | 0.12% |
| 765 | C + EDTA + polyphosphate | 0.10%; 0.12% |
| 766 | C + EDTA + phosphate ester surfactant | 0.10%; 3.0% |
| 767 | C + phosphate ester surfactant + polyphosphate | 3.0%; 0.12% |
| 768 | C + phosphate ester surfactant + polyphosphate + EDTA | 3.0%; 0.12%; 0.10% |

Example 2

Turn-On Energy (TOE) curves were measured in 2.7 ng ink-jet pens (2.7 ng drop weight @ 30% Over Energy (OE)) using Ink ID # 761 (Control). FIG. 1 shows the TOE curves for a pen initially (when the pen is new), after 100 million drops per nozzle (MDPN), and after 200 MDPN. The pen shows drop weight loss over its life from an initial curve at just over 2 ng drop weight to 100 M and 200 M curves which show drop weight under 2 ng.

Example 3

Figure 2:
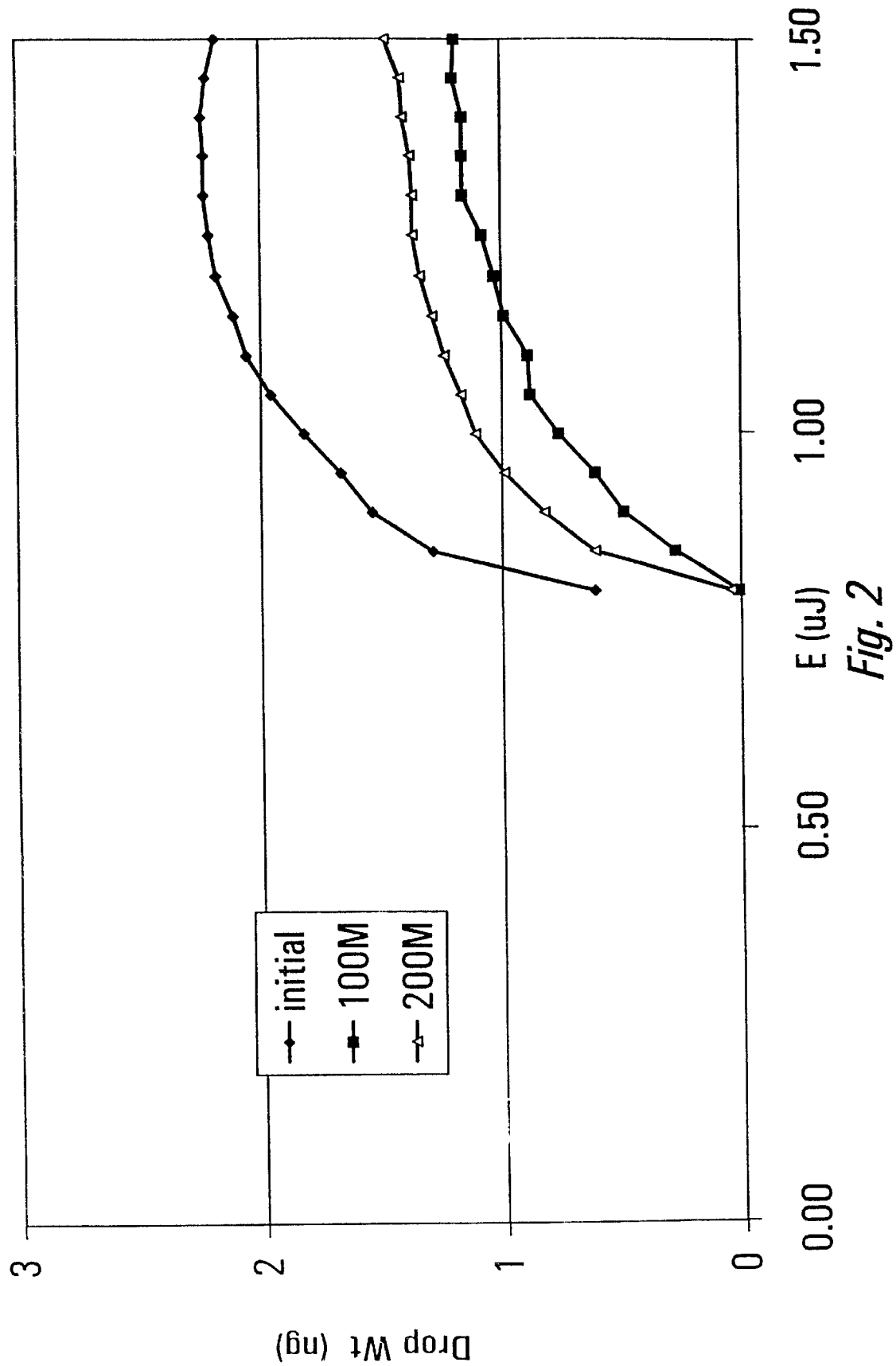
FIG. 2 is a Turn On Energy (TOE) graph for a pen plotting the effect of increasing electrical energy in $\mu J$ on ink drop weight in ng of ink 762 (composition described in Table 1) at initial production of drops, at 100 million drops and at 200 million drops. The Y axis plots ink drop weight in ng. The x axis plots Electrical energy in $\mu J$.

Turn-On Energy (TOE) curves were measured in 2.7 ng ink-jet pens (2.7 ng drop weight @ 30% OE) using Ink ID # 762 (Control+EDTA). FIG. 2 shows the TOE curves for a pen initially (when the pen is new), after 100 million drops per nozzle (MDPN), and after 200 MDPN. The pen shows drop weight loss over its life from an initial curve at just over 2 ng drop weight to 100 M and 200 M curves which show drop weight around 1 ng.

Example 4

Figure 3:
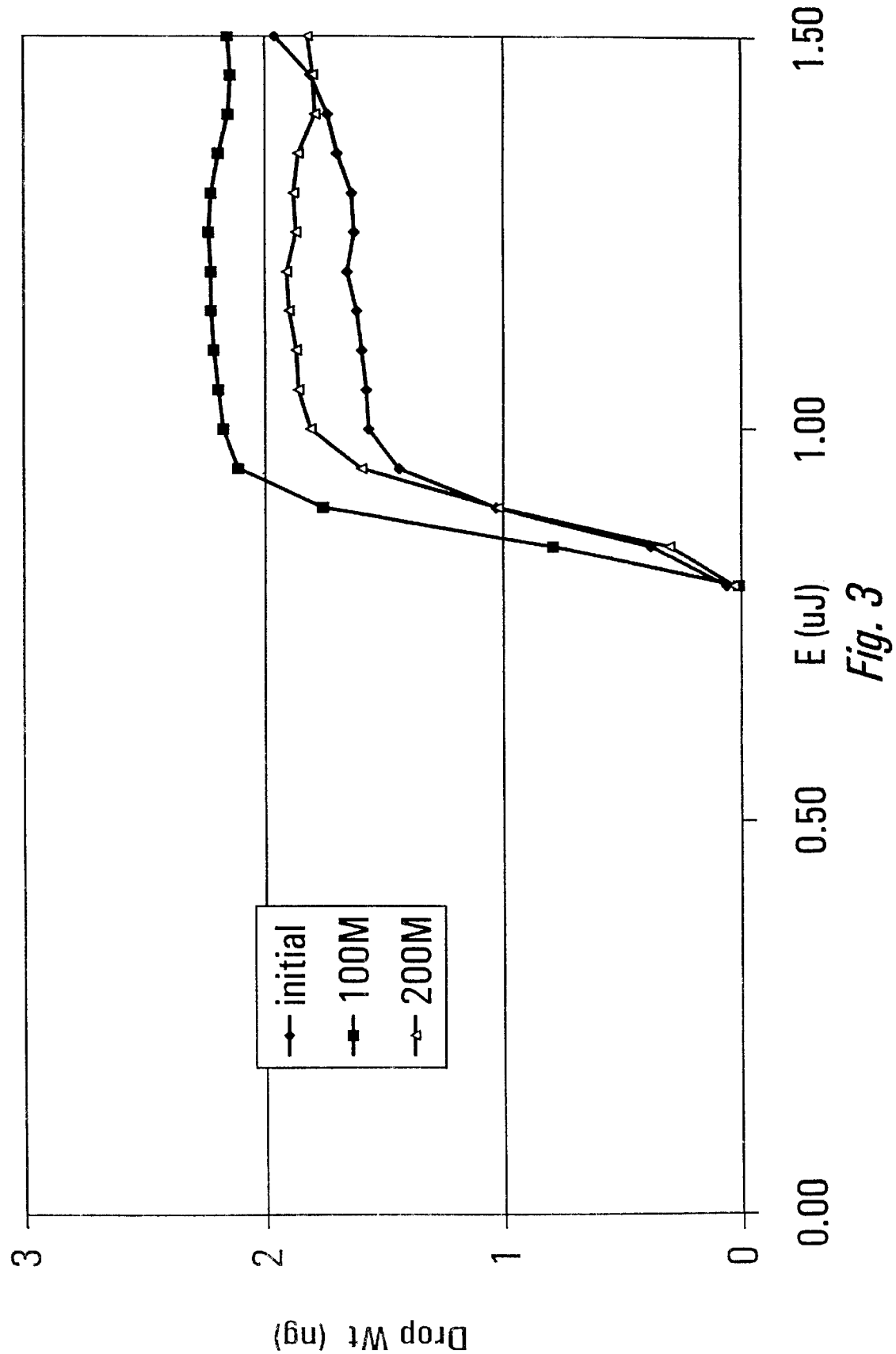
FIG. 3 is a Turn On Energy (TOE) graph for a pen plotting the effect of increasing electrical energy in $\mu J$ on ink drop weight in ng of ink 763 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 763 (Control+phosphate ester surfactant) FIG. 3 shows the TOE curves for a pen initially (when the pen is new), after 100 million drops per nozzle (MDPN), and after 200 MDPN. The pen shows an initial curve at under 2 ng drop weight, a 100 M curve at over 2 ng drop weight and a 200 M curve at just under 2 ng drop weight.

Example 5

Figure 4:
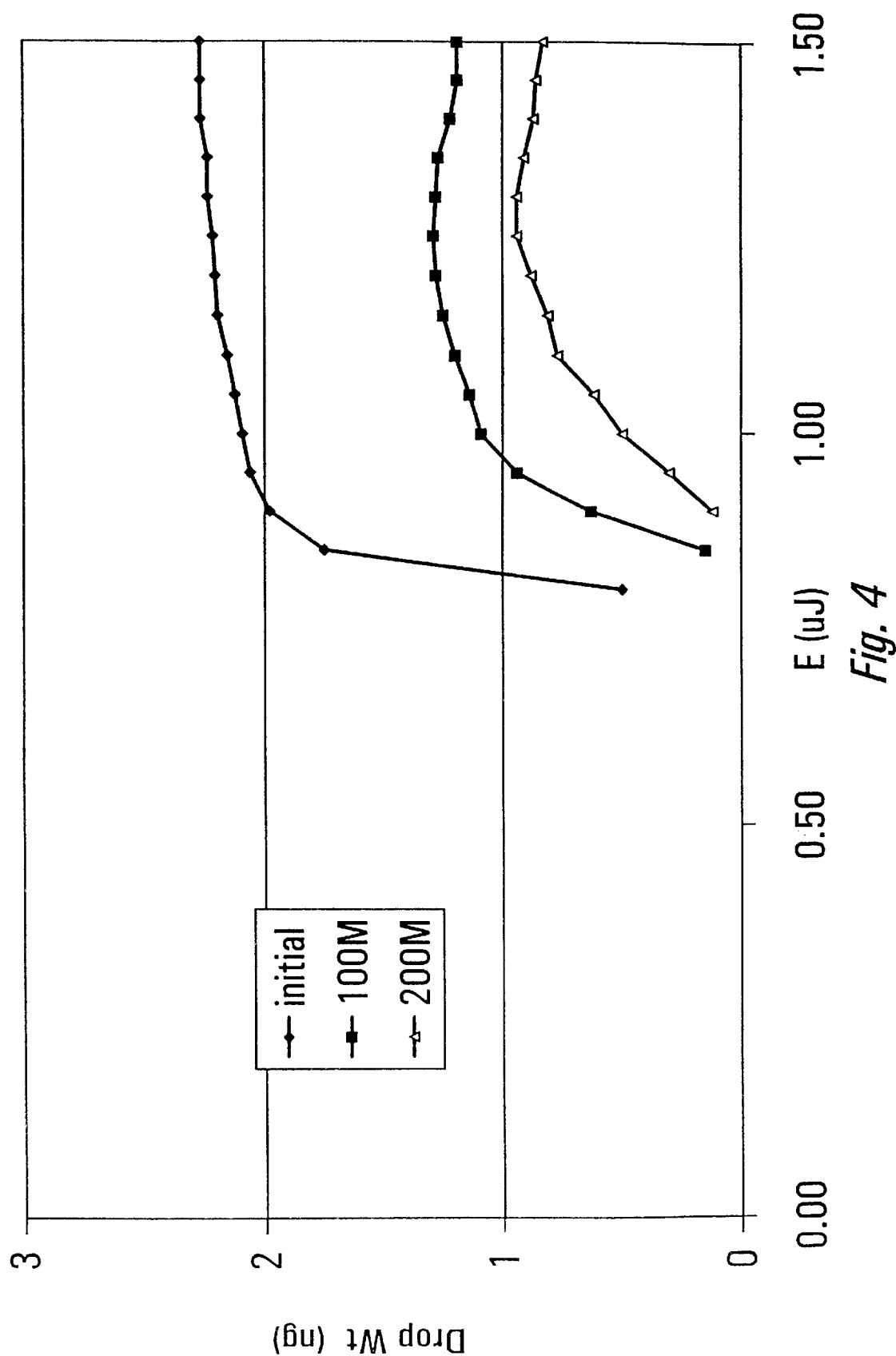
FIG. 4 is a Turn On Energy (TOE) graph for a pen plotting the effect of increasing electrical energy in $\mu J$ on ink drop weight in ng of ink 764 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 764 (Control+Polyphosphate). FIG. 4 shows the TOE curves for a pen initially (when the pen is new), after 100 million drops per nozzle (MDPN), and after 200 MDPN. The pen shows an initial curve having a drop weight just over 2 ng, and 100 M and 200 M curves that have a drop weight around 1 ng.

Example 6

Figure 5:
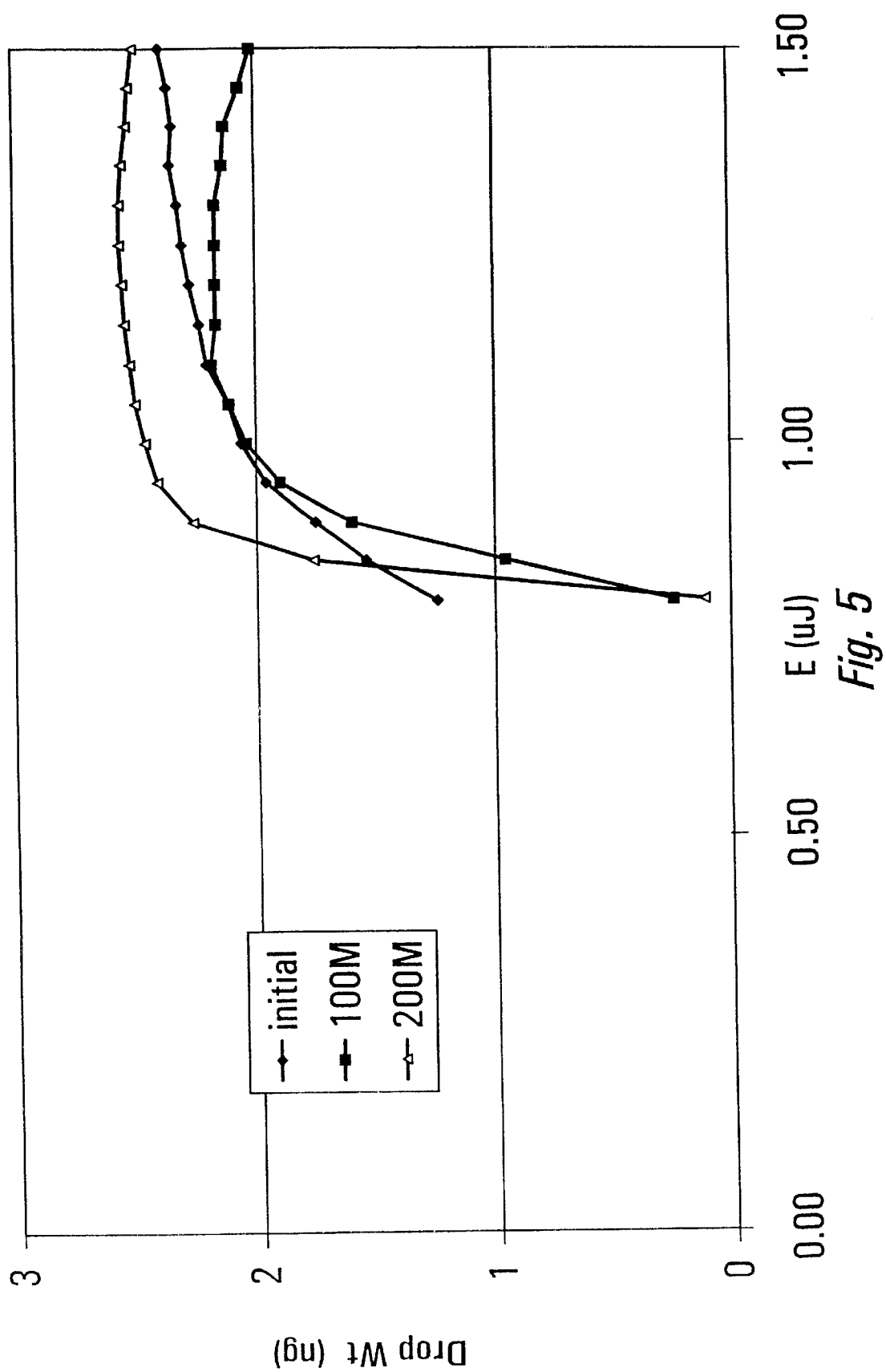
FIG. 5 is a Turn On Energy (TOE) graph for a pen plotting the effect of increasing electrical energy in $\mu J$ on ink drop weight in ng of ink 765 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 765 (Control+EDTA+polyphosphate). FIG. 5 shows the TOE curves for a pen initially (when the pen is new), after 100 million drops per nozzle (MDPN), and after 200 MDPN. The pen shows an initial curve, a 100 M curve and a 200 M curve at around 2 ng.

Example 7

Figure 6:
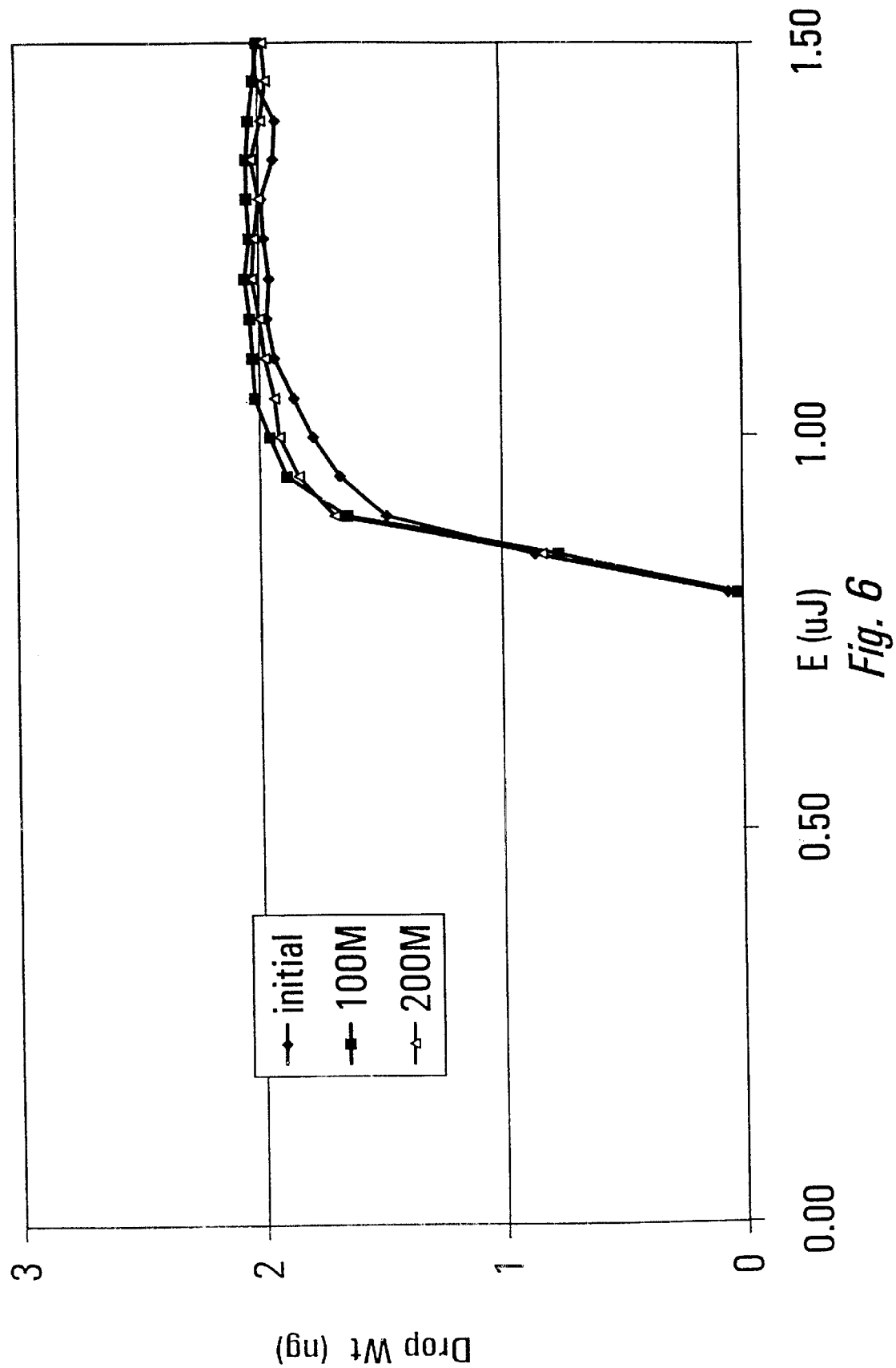
FIG. 6 is a Turn On Energy (TOE) graph for a pen plotting the effect of increasing electrical energy in $\mu J$ on ink drop weight in ng of ink 766 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 766 (Control+EDTA+phosphate ester surfactant). FIG. 6 shows the TOE curves for a pen initially (when the pen is new), after 100 million drops per nozzle (MDPN), and after 200 MDPN. The pen shows an initial curve, a 100 M curve, and a 200 M curve at around 2 ng.

Example 8

Figure 7:
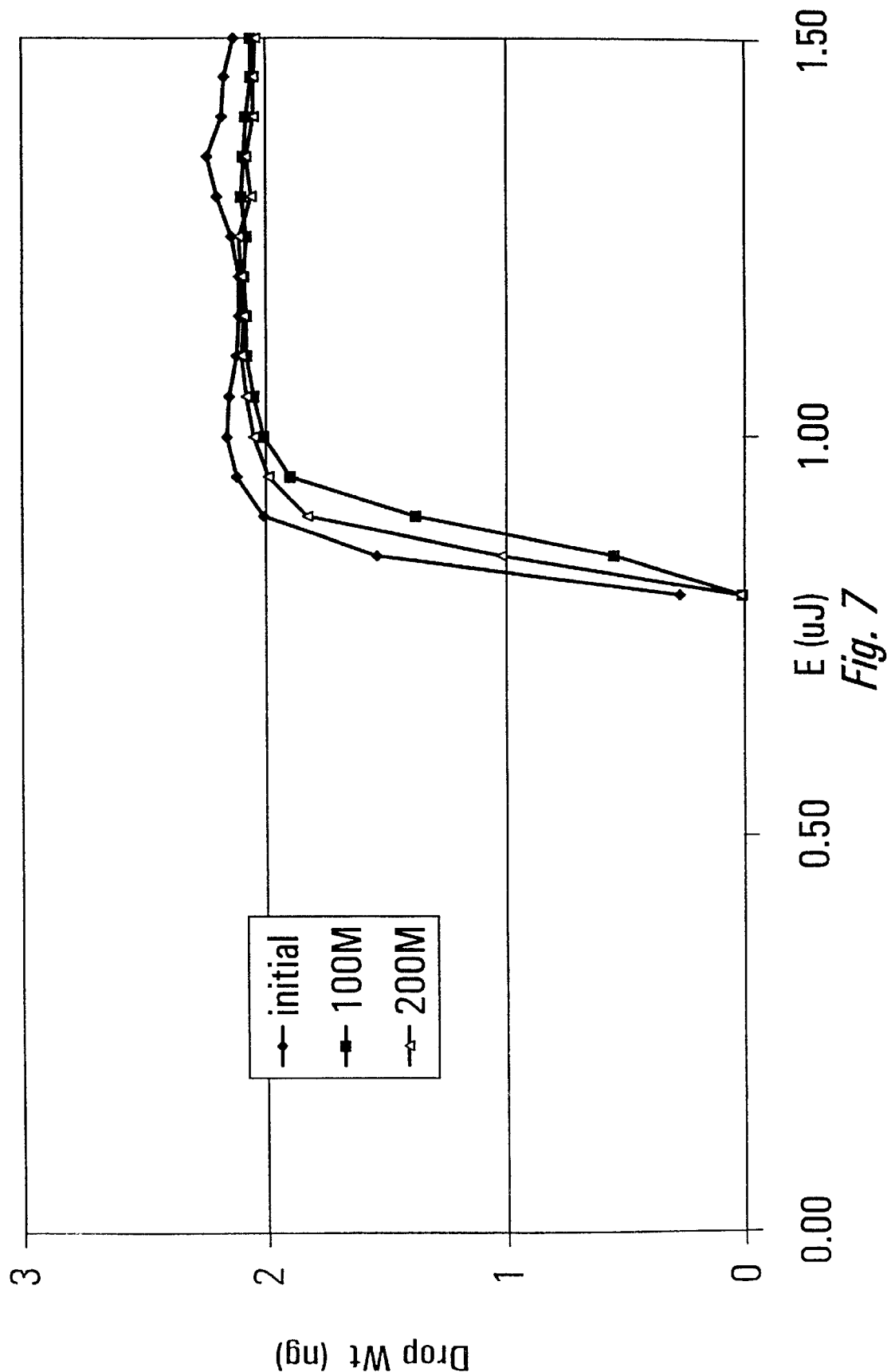
FIG. 7 is a Turn On Energy (TOE) graph for a pen plotting the effect of increasing electrical energy in $\mu J$ on ink drop weight in ng of ink 767 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 767 (Control+phosphate ester surfactant+Polyphosphate). FIG. 7 shows the TOE curves for a pen initially (when the pen is new), after 100 million drops per nozzle (MDPN), and after 200 MDPN. The pen shows an initial curve, a 100 M curve, and a 200 M curve at around 2 ng .

Example 9

Figure 8:
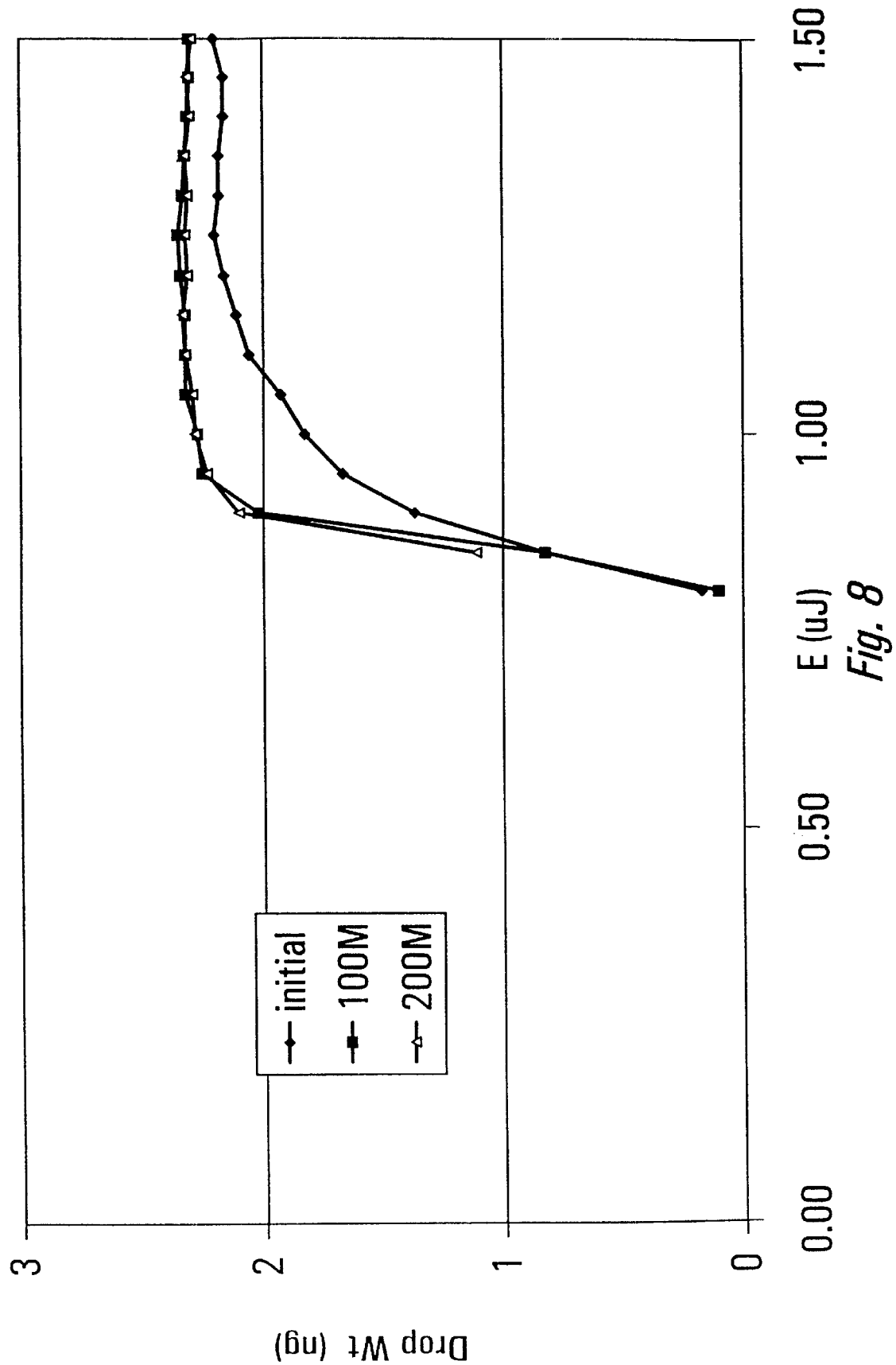
FIG. 8 is a Turn On Energy (TOE) graph for a pen plotting the effect of increasing electrical energy in $\mu J$ on ink drop weight in ng of ink 768 (composition described in Table 1) at initial production of drops, at 100 million drops and at 200 million drops. The Y axis plots ink drop weight in ng. The X axis plots Electrical energy in $\mu J$.

Turn-On Energy (TOE) curves were measured in 2.7 ng ink-jet pens (2.7 ng drop weight @ 30% OE) using Ink ID # 768 (Control+phosphate ester surfactant+Polyphosphate+EDTA). FIG. 8 shows the TOE curves for a pen initially (when the pen is new), after 100 million drops per nozzle (MDPN), and after 200 MDPN. The pen shows an initial curve, a 100 M curve, and a 200 M curve at around 2 ng.

Example 10

Addition of 0.10% EDTA virtually eliminated the kogation problems in a bad lot of HR4C with excess chromium on the order of 2–3 ppm. EDTA addition should in general help the ink tolerance to several transition metals. HR4C is an ink, which in addition to cyan dyes contains (in a typical, non-limiting embodiment): 4.00% Succinic Acid; 2.50% Mackam® OCT50 (a trademark of McIntyre Group Limited Corp.); 0.50% phosphate ester surfactant N-3 Acid; 0.50% Tergitol® 15-S-5 (a trademark of Union Carbide Chemicals and Plastics Company); 10.19% Pentane Diol; 9.56% 2-Pyrrolidone; 4.25% Tetraethylene glycol; and balance water. HR4C does not contain a metal chelating agent such as EDTA. Previously anomalous kogation in a particular lot of HR4C had been traced to excess chromium in the dye concentrate. The net chromium content in the ink was 2–3 ppm. A catalyst used in the dye synthesis was the source of the chromium.

Because of the sensitivity of kogation to metals, the concentrations of free metals must be limited in the inks. But tight specifications on the ink purity to limit the concentration of metals would add to manufacturing costs because it is difficult to protect against inadvertent contamination from the pen filling equipment (such as from corroding metal fittings) and from corrosion inside the pen.

Figure 9:
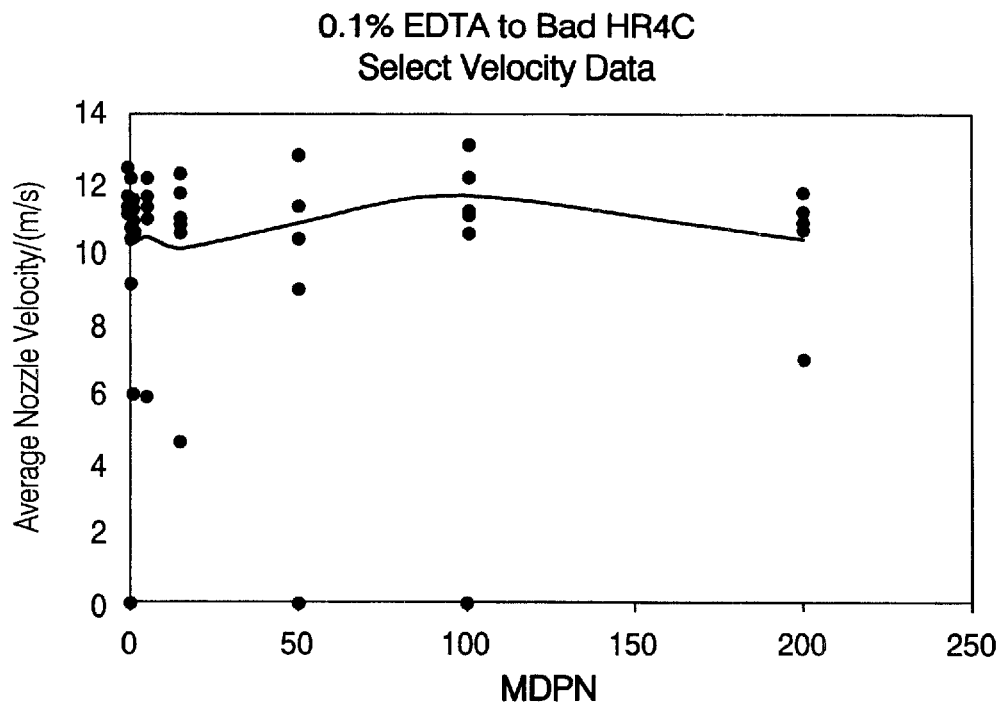
FIG. 9 is a graph plotting average nozzle velocity data in m/s vs. million drops per nozzle (MPDN) for a "bad" (excess chromium) lot of ink-jet ink containing 0.10% EDTA.
Figure 10:
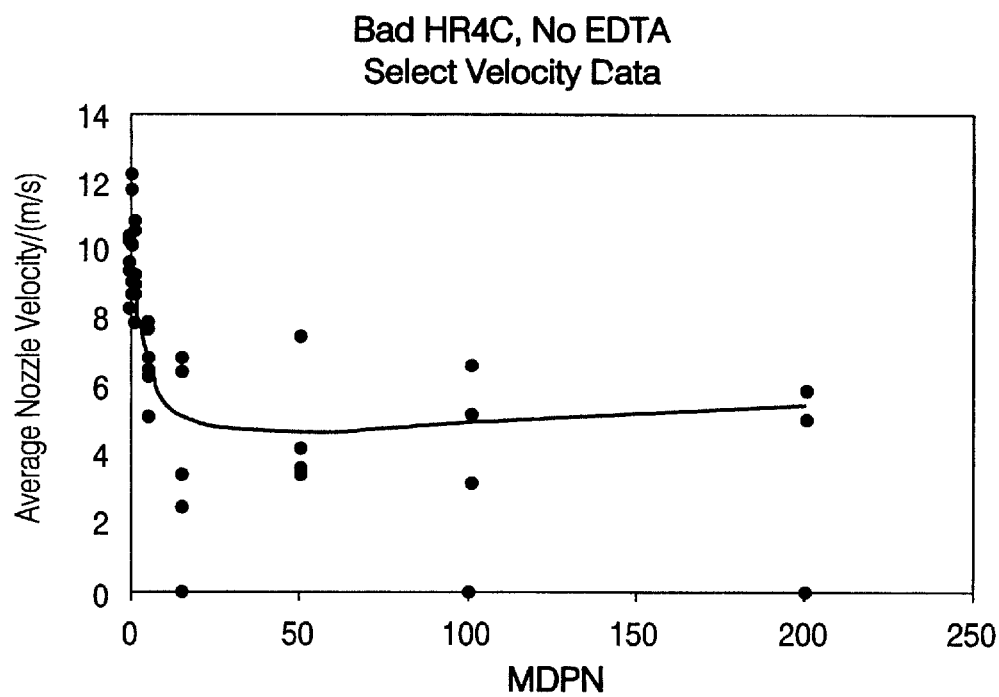
FIG. 10 is a graph plotting average nozzle velocity data in m/s vs. million drops per nozzle (MPDN) for a "bad" (excess chromium) lot of ink-jet ink containing no EDTA.
Figure 11:
FIG. 11 is a photograph of a resistor of an ink-jet pen fired up to 200 million drops with "bad" (excess chromium) ink-jet ink without EDTA.
Figure 12:
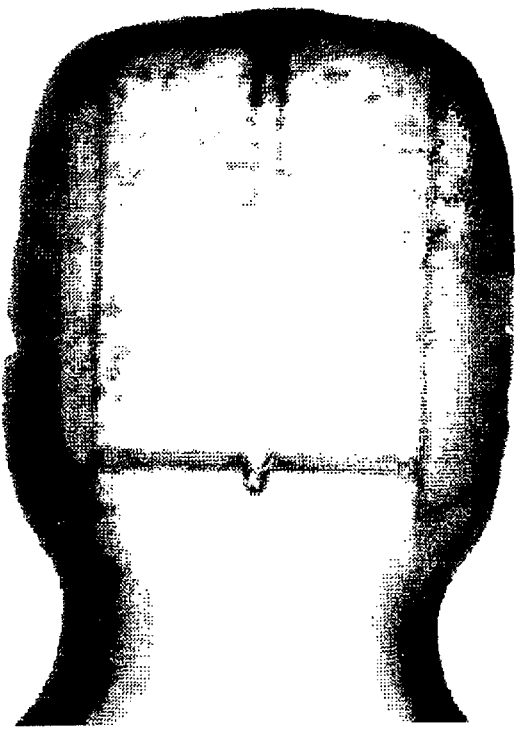
FIG. 12 is a photograph of a resistor of an ink-jet pen fired up to 200 million drops with "bad" (excess chromium) ink-jet ink with 0.10% EDTA.

0.10% EDTA is added to the "bad" lot of HR4C with the intent of increasing the metal tolerance of the inks. Rather than a deliberate addition (or "spiking") of contamination in the ink, the chromium contamination in the "bad" lot represents a true ink manufacturing variation. The results of the experiment show that EDTA dramatically helps control kogation with the "bad" cyan lot. Without EDTA, the drop velocities degraded quickly with a small number of firings. With EDTA the drop velocities were relatively constant and not reduced by kogation. The koga is virtually eliminated on resistors fired up to 200 million drops with four different pens (See FIG. 9). In contrast, the control pens without EDTA have severe koga build up. (See FIG. 10). FIG. 11 is a photograph of a resistor fired 200 million drops of HR4C without EDTA. FIG. 12 is a photograph of a resistor fired 200 million drops of HR4C with 0.10% EDTA.

Example 11

Spiking experiments are useful to determine the sensitivity of the various metals that may be added as impurities in the formulation, carried over from ink manufacturing or produced as corrosion products in the pens and ink supplies. A loss of drop weight over the life of the pen reduces the accuracy of drop placement on the paper and thus degrades print quality. Therefore, the consistency of the drop velocity can be used as a measure of potential print quality. To quantify metal sensitivities, linear regression was applied to the average drop velocity data for resistors fired 50, 100 and 200 MDPN from metal spiked HR4M ink. HR4M is an ink, which in addition to magenta dyes contains (in a typical, non-limiting embodiment): 5.00% Succinic Acid; 2.50% Mackam OCT50®; 0.50% phosphate ester surfactant N-3 Acid; 0.50% Tergitol 15-S-5®; 9.6% Pentane Diol; 7.00% 2-Pyrrolidone; 2.50% Tetraethylene glycol; and balance water. HR4M does not contain a metal chelating agent such as EDTA. A 1 m/s velocity decrease is predicted at the following metal concentrations: 0.2 ppm Cr, 1.3 ppm Al, and 2.5 ppm Fe. Therefore, the metal tolerance is low and addition of a chelating agent to the inks will be important. In these experiments, $Na_2EDTA$ at 0.10% was also shown to control both the aluminum and iron. HR4M contains phosphate ester surfactant N-3 Acid but no chelating agent for metal ions.

HR4M was spiked with the nitrate salts of aluminum, chromium and iron (III). For one ink a nominal amount of 0.10% disodium EDTA was added to the ink to chelate the aluminum and iron ions. Pen performance was quantified by drop velocity measurement after firing different sets of resistors with increasing number of drops. Pens were run at 30% over energy.

Figure 13:
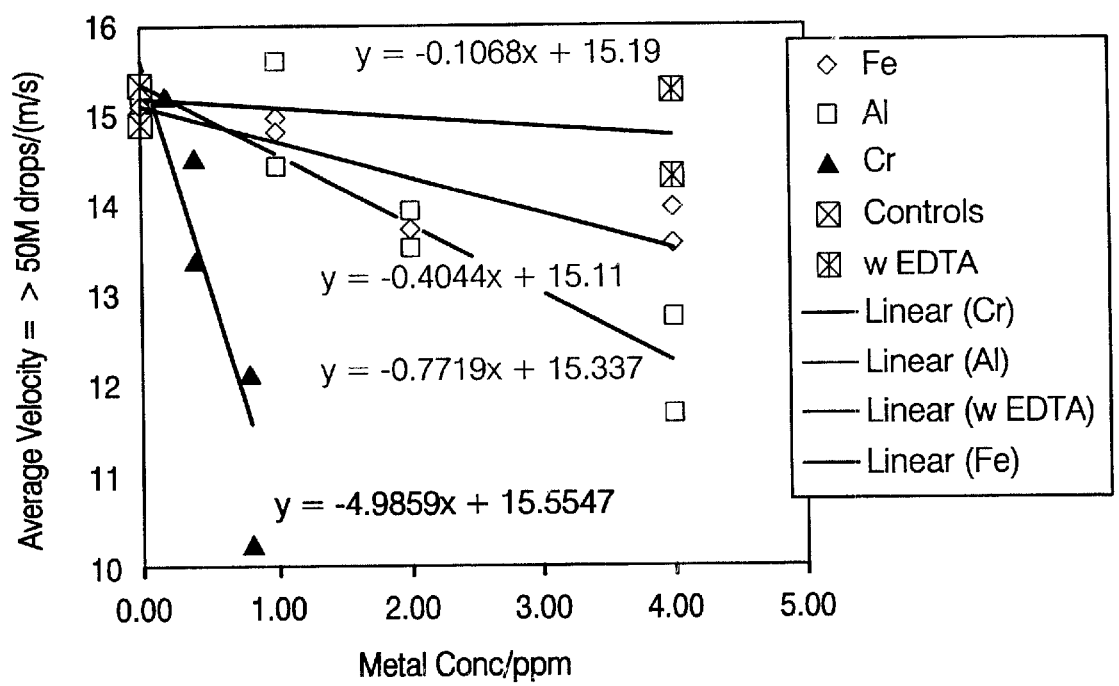
FIG. 13 plots average drop velocity in m/s vs. metal concentration/ppm at 50, 100 and 200 Million Drops Per Nozzle (MPDN).

To help summarize the data, average velocities were calculated for the velocity data at 50, 100 and 200 Million Drops Per Nozzle (MPDN). (See FIG. 13) A measure of the "dose-response" was calculated by linear regression with the y-intercept fixed at the average of the velocities of the control pens. When there is a 1 m/s decrease in the drop velocity, on the order of 0.2 ppm Cr, 1.3 ppm Al and 2.5 ppm Fe can be tolerated.

Chromium clearly has the stronger effect and causes a significant increase in the drop velocity variability. Also shown on the graph are the velocity data for pens with 0.10% EDTA with 3.3 ppm Al and 4 ppm Fe. The EDTA markedly improves the drop velocity. One pen has a lower drop velocity that may be due more to pen variations than a metals effect. In inks comprising EDTA or other metal chelating agents the metals tolerance before a kogation effect is found will be much greater compared to inks without metal chelating agents.

Example 12

HR5Y is distinguished from HR4Y primarily by the addition of 0.10% EDTA. HR4Y is an ink, which in addition to yellow dyes contains (in a typical, non-limiting embodiment): 3.03% Succinic Acid; 2.50% Mackam® OCT50; 0.50% phosphate ester surfactant N-3 Acid; 0.73% Tergitol® 15-S-5; 5.92% Pentane Diol; 9.56% 2-Pyrrolidone; 3.25% Tetraethylene glycol; and balance water. HR4Y does not contain a metal chelating agent such as EDTA. Nozzle clogs in pens with HR4Y ink are due to a "gummy precipitate" composed of an iron-phosphate ester surfactant salt. Experimental results show that EDTA considerably reduces the effect of ferric precipitate at relatively high spiking levels if sufficient time is allowed for the metal digestion. Given that the "gummy precipitate" takes some time to form in the pen, EDTA chelation of the free metals can compete with the precipitation reaction of the free metals with the surface-active phosphate ester.

TABLE 2

| Samples | Ink | Fe/ppm |
|---------|-----|--------|
| 4062-6-2 | HR4Y | 10 |
| 4062-6-3 | HR4Y | 30 |
| 4062-6-4 | HR5Y | 10 |
| 4062-6-5 | HR5Y | 30 |

Samples were initially prepared by addition of a ~1% $Fe(NO_3)_3 \cdot 9H_2O$ salt solution to the ink samples in glass test tubes. In all samples, a precipitate immediately formed upon dripping the solution onto the ink and persisted after mixing. After 4 hours the 4062-6-4 sample became much clearer; the background cloudiness disappeared with only the larger particles persisting. The 4062-6-5 was still cloudy at this time but less than the 4062-3 sample.

After 10 days the 4062-64 and 4062-6-5 samples were more or less clear. Selected samples were filtered through a 0.2 μm pore-size syringe filter attached to a 10 ml syringe. In filtering the 4062-6-2 sample, only ~2 ml could be pressed through the filter before the filter was blocked. Water through the same filter had considerable resistance because the filter pores were irreversibly blocked by the gummy precipitate. Both the 4062-6-4 and -5 samples could be pressed through the filter with some resistance and the heavier spiked sample with more resistance. Water passed through the same filters with little resistance, showing that the pores were not blocked by a gummy precipitate. The filtration results demonstrate the negative effect of precipitation of free metal ions with the surface-active phosphate ester and chelation of the free metal ions with EDTA can eliminate the precipitation.

Example 13

The surface-active phosphate ester in HR4Y and HR5Y inks (specifically the ester is phosphate ester surfactant N-3 Acid) forms gummy precipitates when combined with free metal ions, especially aluminum, iron or some combination. The EDTA metal chelator in the HR5Y (HR4Y does not contain EDTA) binds up the metal ions and prevents the gummy precipitate from forming.

Iron and aluminum nitrate solutions in water were prepared (1.0 and 1.4%, respectively) and added to weighted amounts of the two inks in test tubes with screw caps. The relative amounts are shown below with the "A" samples being HR4Y and the "B" samples being HR5Y. Mole ratios of metals to EDTA and phosphate ester surfactant are also indicated. In no case did the number of moles of metal exceed the moles of EDTA. Spiking with calcium does not produce a precipitate unless high concentrations (>100 ppm) are used and the precipitate in this case is primarily a calcium slat of the dye rather than with the surface-active phosphate ester. The 9A and B samples were not spiked to provide controls for visual observations.

TABLE 3

| 4033-174-XX | | | |
|---|---|---|---|
| | Fe ppm-equiv | Fe to EDTA ratio | Fe to phosphate ester surfactant |
| 3A | 18 | | 0.03 |
| 3B | 18 | 0.09 | 0.03 |
| 4A | 35 | | 0.06 |
| 4B | 36 | 0.19 | 0.06 |
| 5A | 72 | | 0.12 |
| 5B | 75 | 0.39 | 0.13 |
| | Al ppm-equiv | Al to EDTA ratio | Al to phosphate ester surfactant |
| 6A | 8 | | 0.03 |
| 6B | 11 | 0.12 | 0.03 |
| 7A | 19 | | 0.06 |
| 7B | 20 | 0.21 | 0.06 |
| 8A | 40 | | 0.13 |
| 8B | 36 | 0.39 | 0.12 |
| 9A | | | |
| 9B | | | |

Metal solutions were added to the ink in the test tubes with pipettes. Because of the high concentrations at the top before mixing, precipitate formed in all samples. Samples were aged overnight at 60° C. to help bring the samples to equilibrium, to let the metal ions exchange from the precipitate to an EDTA complex. After aging, all of the HR4Y (the "A" samples) had varying amounts of cloudiness or precipitate in proportion to the amount of metal added. All of the HR5Y samples containing 0.10% EDTA in the formulation were indistinguishable from the 9B control sample without added metals. Therefore, HR5Y is much more robust against Fe and Al metal impurities.

Example 14

Under certain conditions the surface-active phosphate ester forms a precipitate that blocks the ink-jet pen nozzle in spite of the presence of EDTA metal chelator in the ink. Precipitates causing nozzle clogs were characterized by Fourier Transform Infra-Red (FTIR) microscopy to obtain a "fingerprint" spectrum that showed characteristics of phosphate ester surfactant N-3 Acid, the surface-active phosphate ester in HR5Y ink. The precipitate had the appearance of a viscous oil and was also found to contain phosphate and tin. The precipitate was shown to be an interaction between the surface active phosphate ester and dioctyltin dilaurate formulated in the adhesive of nozzle tape as a polymerization catalyst.

Spiking HR5Y with dibutyltin dilaurate reproduced essential features of the IR spectrum of the viscous oil-like precipitate. To promote the reaction, the spiked sample (0.16% dibutyltin dilaurate) was heated at 90° C. for two days in a test tube with a threaded cap. Initially the dibutyltin dilaurate floated on top of the ink with an oil-like appearance. After the heating an oil-like substance was found on the bottom of the test tube. Ink was poured out of the test tube with the "oil" adhering to the bottom of the tube. The sample was rinsed several times with water and transferred to a silicon wafer for IR analysis.

As shown in the spectra in FIG. 14, in the heteroatom stretching region (below ~2000 $cm^{-1}$) the spectrum of the bottom "oil" showed a reasonable match to viscous oil-like precipitate that was found in the pen and formed by the reaction of the surface-active phosphate ester with the dioctyltin dilaurate catalyst which had leached from the nozzle adhesive. Additional peaks around 1710 $cm^{-1}$ and 1600 $cm^{-1}$ that are not seen in the viscous oil-like precipitate show a good match in shape and position to peaks in the dibutyltin dilaurate impurity from unreacted spiking material.

Figure 14:
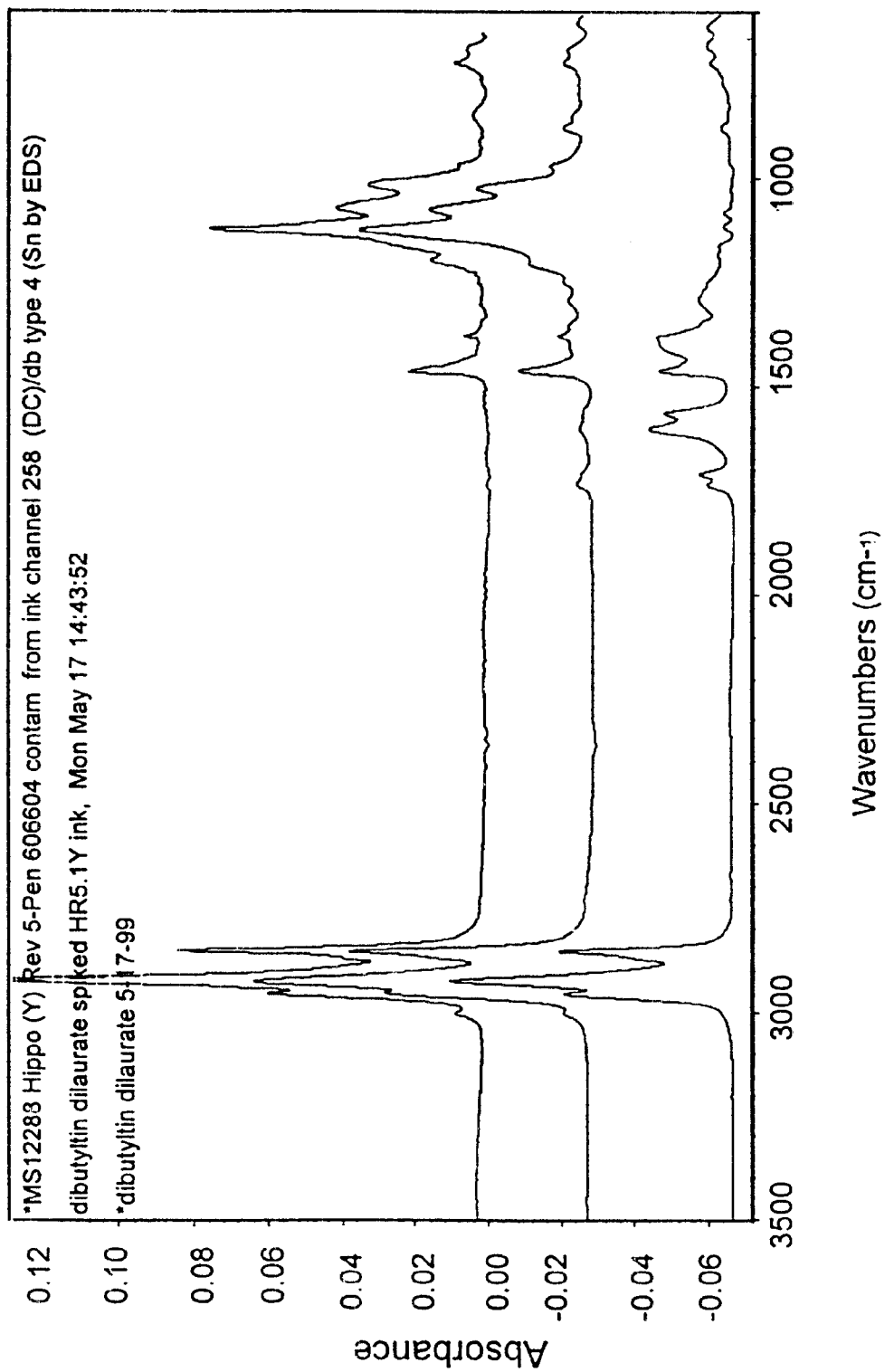
FIG. 14 shows spectra obtained from Infrared (IR) spectroscopy of (i) the viscous oil-like precipitate formed by interaction of the HR5Y ink and the nozzle tape containing dioctylin dilaurate; (ii) precipitate of dibutyltin dilaurate and the surface-active phosphate ester in HR5Y ink and (iii) dibutyltin dilaurate.

Though not very apparent in the spectra shown in FIG. 14, the $CH_2$ stretching strengths are relatively stronger in the spectrum of the viscous oil-like precipitate made by interaction of the tape with the ink than the spectra of the spike-created sample. The longer hydrocarbon substitutions are consistent with the differences in the hydrocarbon stretching strengths of dioctyltin dilaurate relative to those of dibutyltin dilaurate.

Example 15

The viscous oil-like precipitate is due to a precipitation reaction between dioctyltin dilaurate catalyst in the tape and the surface-active phosphate ester added into the ink to provide kogation protection. A chelating agent for the organotin can prevent this precipitation and nozzle blockage. Chelating agents for organotin were tested in test tube experiments with HR5Y ink spiked with dibutyltin dilaurate. A chelating agent must bind more strongly to the organotin and the surface-active phosphate ester to prevent the formation of the viscous oil-like precipitate. The 2,6 pyridinedicarboxylic acid was found to be an effective chelator for the organotin. Additional EDTA, the chelator already formulated in the HR5Y ink, did not have any beneficial effect against the organotin.

The reaction producing viscous oil-like precipitate in HR5Y occurs under accelerated storage life conditions at temperatures as low as 40° C. Some of the viscous oil-like precipitate can be blown out of the pen during initial servicing of the pen on start up. However a few nozzles remain blocked. A replacement tape without the organotin catalyst in the adhesive may not have the same balance of material properties as the current nozzle tape. The surface-active phosphate ester additive is needed to prevent kogation and prolong resistor life.

One solution for correcting viscous oil-like precipitate without removing the phosphate ester surfactant or changing the tape is the addition of a chelating agent that bonds more strongly to the organotin than phosphate ester surfactant. EDTA is already added to the HR5 inks. Because the tin is in an organo form not a tin salt, the EDTA is not an effective chelating agent, presumably because the alkyl groups sterically interfere with the multi-dentate binding of the EDTA. An additional chelator specifically for the organotin would have to be added to the ink. Candidates include rigid ring structures in which bonding to the organotin has less of an entropy penalty and can lock into the tin in between the covalently attached alkyl chains.

For testing chelation, dibutyltin dilaurate was used in place of the dioctyltin dilaurate reported to be formulated in the tape. The dibutyltin form is a reasonable substitute for spiking experiments and is predicted to have a very similar reaction chemistry.

A ~0.2% mixture of dibutyltin dilaurate in HR5Y ink was prepared. The spiked ink is vigorously mixed with a magnetic stirrer. Weighed amounts of potential chelators (or dispersing aids) are added to capped test tubes. The ink is then separated into the test tubes and placed overnight in the 90° C. oven. The following day samples are evaluated by observing the tubes in front of a light source.

Addition of disodium EDTA well above stoichiometric concentrations had no effect on the viscous oil-like precipitate formation, confirming that EDTA is not an appropriate chelator for organotin.

Figure 15:
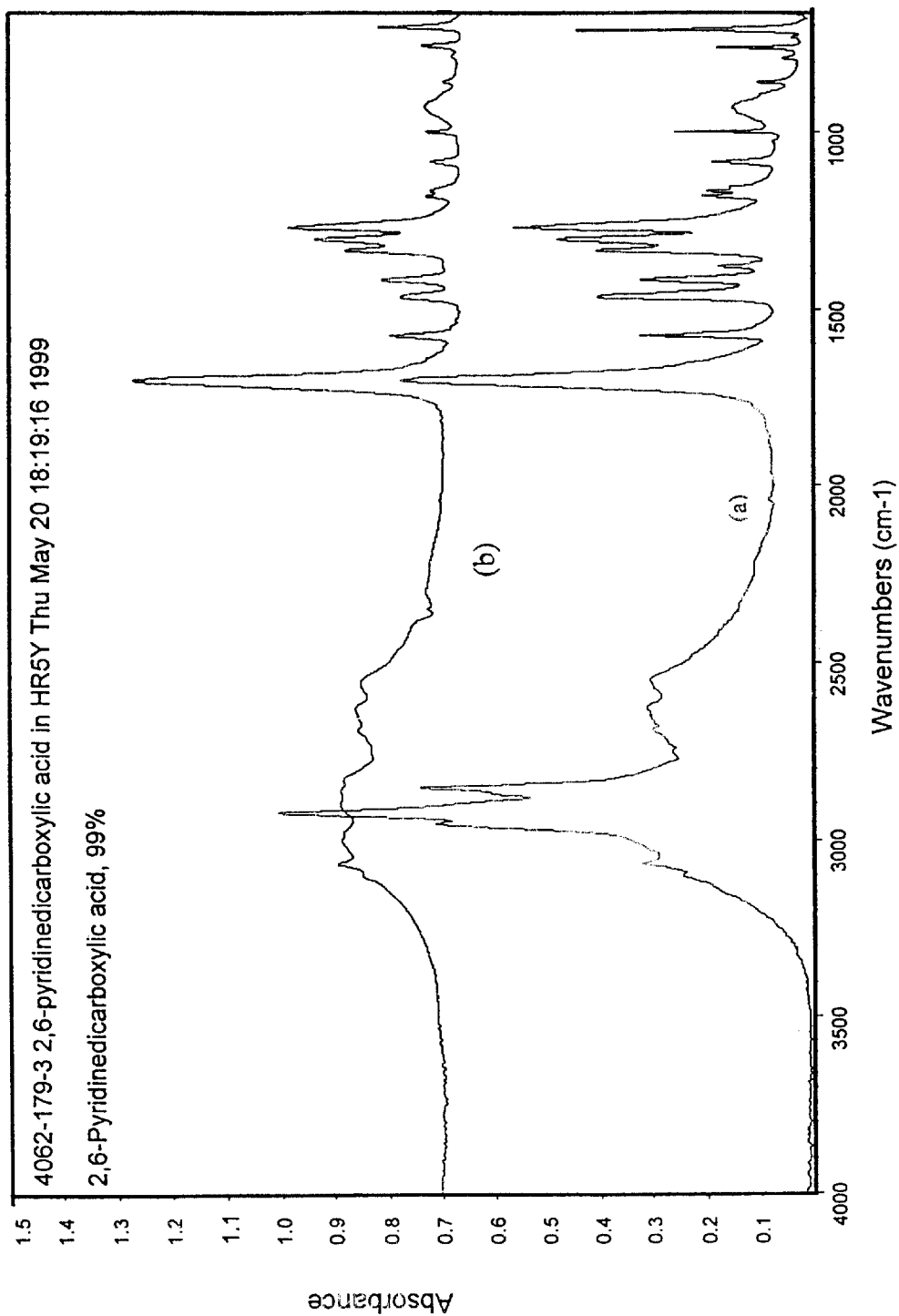
FIGS. 15 and 16, respectively, show spectra obtained by IR spectroscopy of the filtrate in HR5Y and the starting chelator material, 2,6-pyridinedicarboxylic acid.
Figure 16:
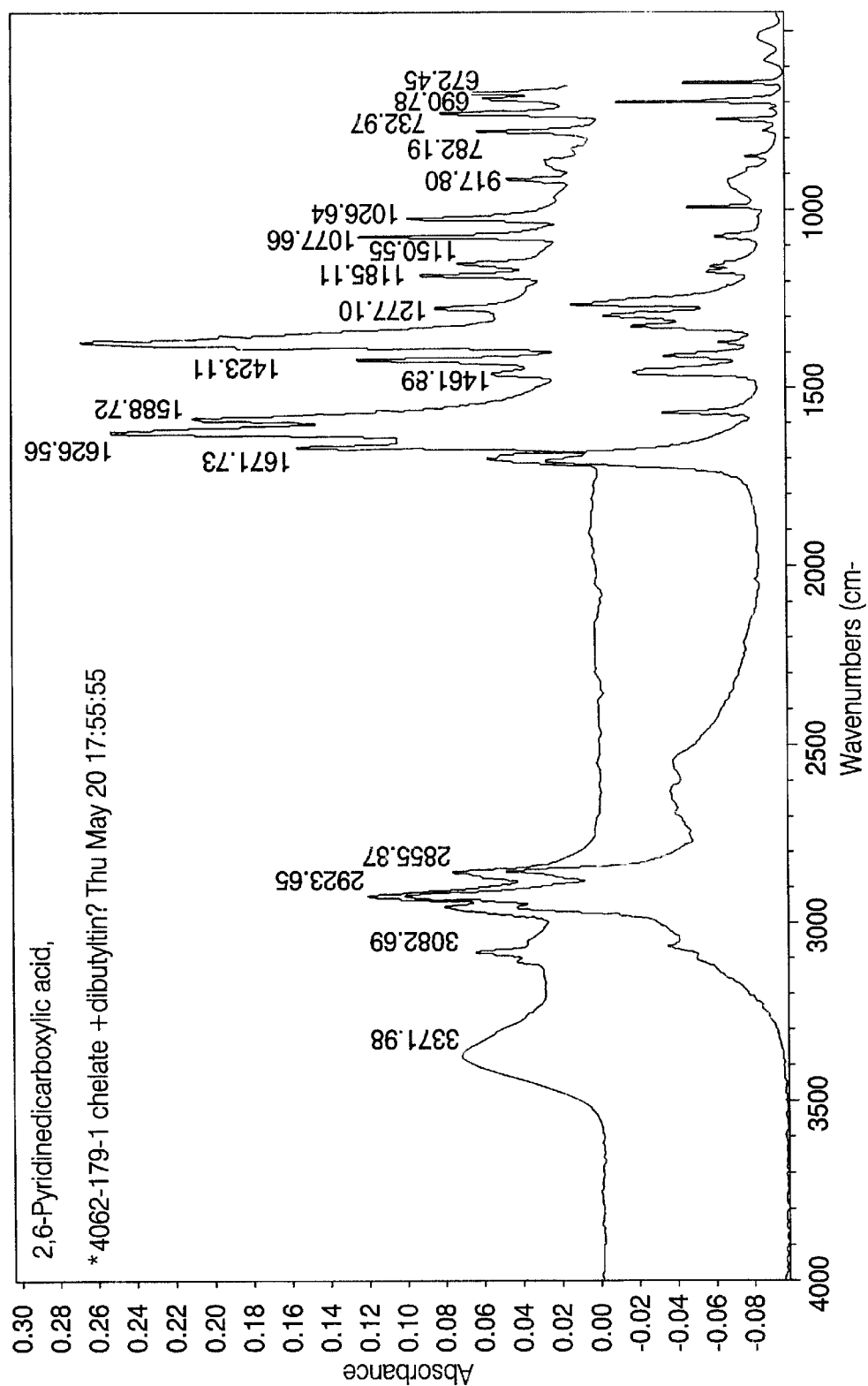

The 2,6-pyridinedicarboxylic acid (a.k.a. dipicoline acid) worked well for organotin chelation but the 2,6-pyridinedicarboxylate-dibutyltin complex does have a limited solubility at room temperature. When the test tube containing this chelator was removed from the oven, the ink was completely clear without a trace of the viscous oil-like precipitate. However, about an hour after cooling to room temperature, the ink became cloudy and a fine white precipitate settled to the bottom of the tube. In a series of test tubes with different amounts of the chelator added but the same amount of organotin, the amount of precipitate was roughly constant, suggesting the precipitate is the organotin-2,6-pyridinedicarboxylate complex rather than undissolved chelator. The filtrate of the ink was characterized by IR spectroscopy and compared to the starting chelator material (see FIGS. 15 and 16). The IR spectrum of the filtrate looks like a salt of the 2,6-pyridinedicarboxylic acid. Also considered was precipitation of the lauric acid byproduct but this does not agree with the IR spectrum of the precipitate.

Precipitation of the complex with the organotin may or may not be a problem. Additions of dibutyltin dilaurate as low as 0.2% is still well above the solubility even at 90° C. For the dioctyltin dilaurate in the tape, the solubility is expected to be even less. It is possible that the addition of less than 40 ppm or less of a chelating agent is enough to correct the viscous oil-like precipitate problem.

Figure 17A:
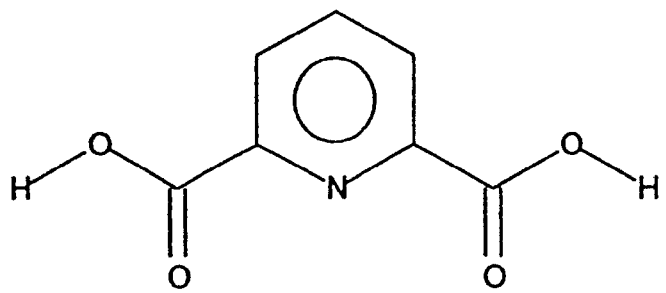
FIG. 17 shows structures of 2,6-pyridinedicarboxylic acid; Aminodiacetic acid; and 2-pydinecarboxylic acid (Picoline acid).
Figure 17B:
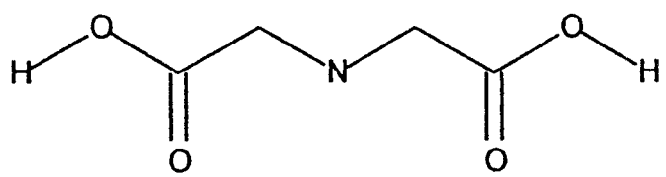
Figure 17C:
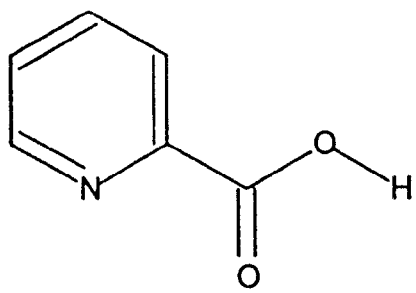

It is interesting that chelators with related structures were not effective (see FIG. 17). Aminodiacetic acid did not eliminate the viscous oil-like precipitate. Perhaps in the case of 2,6-pyridinedicarboxylic acid, having the carboxylate groups attached to a rigid aromatic ring reduces some of the entropy penalty of chelating the organotin. Picoline acid with only one carboxylate group also did not work, suggesting the multi-dentation is important in the stronger chelation ability of the 2,6-pyridinedicarboxylic acid.

The chelator with the acid and amine groups on one side of the aromatic ring is potentially very surface active on the tantalum surface and it is thought that the chelator can have strong effects on resistor health by etching away the tantalum. As a quick check, HR5Y inks with different amounts of 2,6-pyridinedicarboxylic acid has no effect on the drop velocity; even up to the 1070 ppm concentration; the drop velocity behavior is for the most part the same as the control. Even after pens were fired 200 million drops per nozzle with ink containing up to 1070 ppm of the chelator, there was no evidence of the tantalum resistor coating being eroded by high concentrations of the chelator.

The reagent, 1,2-pyridylazo-2-naphthol, is a "metallizing" dye which turns from a pale yellow to a dark red after reacting with the organotin. The dye has a poor solubility in the ink and may not be an appropriate chelator because of its color except if used in very sparing amounts. Another metallizing dye, pyrocatecholl violet can also chelate organotin in the presence of the surface-active phosphate ester.

Example 16

The viscous oil-like precipitate is due to a precipitation reaction between dioctyltin dilaurate in the nozzle tape and the surface-active phosphate ester added in the HR5Y ink. A chelating agent for the organotin such as 2,6-pyridinedicarboxylic acid can prevent this precipitation and nozzle blockage.

Three lots of ink were produced by the addition of different quantities of the organotin chelating agent to HR5Y ink. Lot 1 was the control ink without an addition of the organotin chelating agent. Lot 2 and Lot 3 had 20 and 40 ppm respectively of the 2,6-pyridinedicarboxylic acid organotin chelator added to the ink. Pens were filled with the different inks and taped with nozzle tape containing dioctyltin dilaurate in the adhesive. The pens were pouched in air-impermeable bags and stored nozzles up in 60° C. ovens for 2 weeks. The elevated temperature storage simulates long-term aging of the pens by speeding reaction times. Upon removal from the oven, pens were printed to detect pens with missing nozzles. The pens with missing nozzles were printed 190,000 drops per nozzles and examined a second time for missing nozzles that had not been cleared during the printing.

The control set of pens (34 pens total) filled with the Lot 1 ink had two pens with nozzles out due to contamination that had the appearance under the light microscope of the viscous oil-like precipitate. A total of five nozzles were affected. The FTIR spectrum of the precipitate taken from one of the pens matched the spectrum of the viscous oil-like precipitate formed from the precipitation reaction between the dioctyltin dilaurate in the tape and the surface-active phosphate ester.

The second pen set (35 pens total) filled with Lot 2 ink comprised of 20 ppm of the 2,6-pyridinedicarboxylic acid had no pens affected by the viscous oil-like precipitate. Only one nozzle of one pen was blocked. it was determined that the affected nozzle was blocked by an air bubble, which may be cleared in the normal servicing of a pen in a normal printer device.

The third set of pens (35 pens total) filled with Lot 3 ink comprising 40 ppm of the 2,6-pyridinedicarboxylic acid had no pens affected by the viscous oil-like precipitate. One pen had one nozzle with a solid substance clogging the nozzle. By FTIR analysis this solid substance was confirmed to be the precipitate of the organotin-chelator complex of dioctyltin and the 2,6-pyridinedicarboxylic acid organotin chelator.

Addition of the 2,6-pyridinedicarboxylic acid organotin chelator at 40 and 30 ppm can completely eliminate the formation of the viscous oil-like precipitate. A solid substance that can block nozzles forms by the precipitation of the chelation complex. The precipitation of the organotin chelator complex can be prevented or minimized by the use of an organotin chelator that forms a more soluble organotin-chelator complex or by the use of small concentrations of the organotin chelator in order to reduce the rate of reaction of the organotin chelator with the organotin and to allow time for the organotin-chelator complex to diffuse into the bulk ink away from the nozzle channels before the solubility limit is reached.

Example 17

In order to test the effect of phosphate ester on resistor life in thermal ink-jet pens, 100 pens were filled with HR3Y ink with 3% phosphate ester surfactant and 100 pens were filled with HR3Y ink with only 0.5% phosphate ester surfactant. HR3Y is an ink, which in addition to yellow dyes contains (in a typical, non-limiting embodiment): 1.94% Succinic Acid; 6.00% Pentane Diol; 10.22% 2-Pyrrolidone; EHPD 4.25%; and balance water. HR3Y does not contain a metal chelating agent such as EDTA. All pens were resistor-life tested to 200 million drops per nozzle. Over 50% of the pens with 0.5% phosphate ester surfactant had one or more resistor failures at 200 MDPN. None of the 100 pens with 3% phosphate ester surfactant had resistor failures by 200 MDPN.

Example 18

Eight 6.0 picoliter ink-jet pens and eight 2.7 picoliter ink-jet pens were filled with RR2C ink and resistance-life tested at 30% OE. RR2C is an ink, which in addition to cyan dyes contains (in a typical, non-limiting embodiment): 3.9% Butanediol; 3.2% Neopentyl glycol; 2.0% Multranol 4012; 1.6% Dantocol DHE; 0.55% Dowfax 8390; 0.5% Silwett L77; 0.5% Tergitol 15-S-7; 0.2% MOPS-buffer; 0.2% Proxel GXL-biocide and balance water. Pens were removed from the test for a drop weight loss of 10% below the original drop weight or when they had exceeded 500 MDPN. Three of the eight 2.7 picoliter pens failed for drop weight loss before 500 MDPN, while none of the eight 6.0 picoliter pens failed before 500 MDPN. However, an autopsy of the 6.0 picoliter pens after firing 500 MDPN clearly showed the same kogation formation on the resistor surface as the 2.7 pL pens. Both the 2.7 picoliter and 6.0 picoliter pens show a steady decline in drop weight with the number of drops fired. But the 2.7 picoliter pens failed earlier in life than the 6.0 picoliter pens, showing that the 6.0 picoliter pens continue to function longer in spite of kogation than the 2.7 picoliter pens.

While the foregoing invention has been described in some detail for purposes of clarity and understanding, it will be clear to one skilled in the art from the reading of this disclosure that various changes in form and detail can be made without departing from the true scope of the invention.

What is claimed is:

1. An ink-jet ink composition for reducing kogation and prolonging ink-jet pen life comprising:
   at least one colorant; and
   an aqueous vehicle, the vehicle comprising
   at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum;
wherein the at least one refractory or noble metal-reactive component further comprises
   phosphate esters,
   the phosphate esters having the structure $$(RE_x)_y PO_{(4-y)} H_{(3-y)}$$

where R is a branched hydrocarbon, unbranched hydrocarbon, or perfluoronated hydrocarbon with at least eight carbons; E is an ethyoxy group (—CH$_2$CH$_2$O—); X is an integer greater than or equal to 0 and Y is an integer from 1 to 3.

2. The ink-jet ink composition according to claim 1 wherein the phosphate esters are from 0.1 to 3% by weight of the ink composition.

3. The ink-jet ink composition according to claim 2 wherein the phosphate esters are from 0.2 to 0.5% by weight of the ink composition.

4. The ink-jet ink composition according to claim 2 wherein the phosphate esters are from 0.5 to 3% by weight of the ink composition.

5. The ink-jet ink composition according to claim 1 wherein the refractory or noble metal is tantalum.

6. The ink-jet ink composition according to claim 1 wherein the ink-jet ink composition is used in an ink-jet ink pen, the ink-jet pen having a minimum drop volume range of from 1 to 10 picoliters.

7. The ink-jet ink composition according to claim 6 wherein the ink-jet ink composition is used in an ink-jet ink pen, the ink-jet pen having a minimum drop volume range of from 3 to 6 picoliters.

8. The ink-jet ink composition according to claim 1 wherein the ink-jet ink composition is used in an ink-jet pen, the ink-jet pen being able to be fired at least 50 million times without being replaced.

9. The ink-jet ink composition according to claim 8 wherein the ink-jet ink composition is used in an ink-jet pen, the ink-jet pen being able to be fired at least 100 million times without being replaced.

10. The ink-jet ink composition according to claim 8 wherein the ink-jet ink composition is used in an ink-jet pen, wherein the ink-jet ink is replaceable in the ink-jet pen.

11. The ink-jet ink composition according to claim 1 wherein the at least one colorant is selected from a group consisting of a dye and a pigment.

12. The ink-jet ink composition according to claim 1 wherein the aqueous vehicle further comprises at least one chelating agent.

13. The ink-jet ink composition according to claim 12 wherein the at least one chelating agent is selected from the group consisting of simple metal chelators and organometal chelators.

14. The ink-jet ink composition according to claim 13 wherein the simple metal chelators are selected from the group consisting of Ethylenediaminetetraacetic acid (EDTA), Diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, and salicylic acid.

15. The ink-jet ink composition according to claim 13 wherein the organometal chelators are selected from the group consisting of 2,6-pyridinedicarboxylic acid, 1,2-pyridylazo-2-naphthol and pyrocatecholl violet.

16. The ink-jet ink composition according to claim 13, wherein the at least one chelating agent is from 0.1 to 1% by weight of the ink composition.

17. A method for ink-jet printing, said method comprising the step of ejecting ink, said ink comprising:
at least one colorant; and
an aqueous vehicle, the vehicle comprising
at least one refractory or noble metal-reactive component in an amount sufficient, when the composition is used in an ink-jet pen, to form a protective thin layer on an outer layer of a resistor surface of the ink-jet pen, the outer layer comprising a refractory or noble metal, the refractory or noble metal being selected from the group consisting of titanium, zirconium, hafnium, vanadium, niobium, tantalum, chromium, molybdenum, tungsten, gold, silver and platinum wherein the at least one refractory or noble metal-reactive component comprises phosphate esters, the phosphate esters have the structure

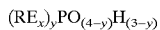

where R is a branched hydrocarbon, unbranched hydrocarbon, or perfluoronated hydrocarbon with at least eight carbons; E is an ethyoxy group (—CH$_2$CH$_2$O—); X is an integer greater than or equal to 0 and Y is an integer from 1 to 3.

18. The method for ink-jet printing according to claim 17 wherein the phosphate esters are from 0.1 to 3% by weight of the ink composition.

19. The method for ink-jet printing according to claim 18 wherein the phosphate esters are from 0.2 to 0.5% by weight of the ink composition.

20. The method for ink-jet printing according to claim 18 wherein the phosphate esters are from 0.5 to 3% by weight of the ink composition.

21. The method for ink-jet printing according to claim 17 wherein the refractory or noble metal coating the outer layer of the resistor surface is tantalum.

22. The method for ink-jet printing according to claim 17 wherein the ink-jet pen has a minimum drop volume range of from 1 to 10 picoliters.

23. The method for ink-jet printing according to claim 22, wherein the ink-jet pen has a minimum drop volume range of from 3 to 6 picoliters.

24. The method of ink-jet printing according to claim 17 wherein the ink-jet pen can be fired at least 50 million times without being replaced.

25. The method of ink-jet printing according to claim 24 wherein the ink-jet pen can be fired at least 100 million times without being replaced.

26. The method of ink-jet printing according to claim 24 wherein the ink in the ink-jet pen is replaceable.

27. The method of ink-jet printing according to claim 17 wherein the at least one colorant is selected from a group consisting of a dye and a pigment.

28. The method of ink-jet printing according to claim 17 wherein the aqueous vehicle further comprises at least one chelating agent.

29. The method of ink-jet printing according to claim 28 wherein the at least one chelating agent is selected from the group consisting of simple metal chelators and organometal chelators.

30. The method of ink-jet printing according to claim 29 wherein the simple metal chelators are selected from the group consisting of Ethylenediaminetetraacetic acid (EDTA), Diethylenetetraminepentaacetic acid (PTPA), trans-1,2-diaminocyclohexanetetraacetic acid (CDTA), (ethylenedioxy) diethylene dinitrilotetraacetic acid (EGTA), malonic acid, and salicylic acid.

31. The method of ink-jet printing according to claim 29 wherein the organometal chelators are selected from the group consisting of 2,6-pyridinedicarboxylic acid, 1,2-pyridylazo-2-naphthol and pyrocatecholl violet.

32. The method of ink-jet printing according to claim 28, wherein the at least one chelating agent is from 0.1 to 1% by weight of the ink composition.

* * * * *